United States Patent
Kriechbaum et al.

(10) Patent No.: US 12,479,666 B2
(45) Date of Patent: Nov. 25, 2025

(54) TRANSPORT CARRIER SYSTEM AND OVERHEAD CONVEYOR DEVICE COMPRISING TRANSPORT CARRIERS FOR TRANSPORTING SUSPENDED GOODS

(71) Applicant: TGW Logistics GmbH, Marchtrenk (AT)

(72) Inventors: Thomas Kriechbaum, Bad Schallerbach (AT); Martin Rausch, Gmunden (AT)

(73) Assignee: TGW Logistics GmbH, Marchtrenk (AT)

( * ) Notice: Subject to any disclaimer, the term of this patent is extended or adjusted under 35 U.S.C. 154(b) by 980 days.

(21) Appl. No.: 17/429,122

(22) PCT Filed: Feb. 7, 2020

(86) PCT No.: PCT/AT2020/060037
§ 371 (c)(1),
(2) Date: Aug. 6, 2021

(87) PCT Pub. No.: WO2020/160585
PCT Pub. Date: Aug. 13, 2020

(65) Prior Publication Data
US 2022/0048711 A1    Feb. 17, 2022

(30) Foreign Application Priority Data
Feb. 7, 2019   (AT) ............... A 50092/2019

(51) Int. Cl.
*B65G 9/00*       (2006.01)
*B65G 17/20*    (2006.01)
(Continued)

(52) U.S. Cl.
CPC ............. *B65G 9/002* (2013.01); *B65G 9/004* (2013.01); *B65G 17/20* (2013.01); *B65G 17/42* (2013.01);
(Continued)

(58) Field of Classification Search
CPC ........ B65G 9/002; B65G 9/004; B65G 17/20; B65G 17/42; B65G 19/025; B65G 47/61; B65G 2201/0229
(Continued)

(56) References Cited

U.S. PATENT DOCUMENTS

| 4,433,627 A | 2/1984 | Forshee |
| 4,866,255 A | 9/1989 | Sing |

(Continued)

FOREIGN PATENT DOCUMENTS

| AT | 520 517 A4 | 5/2019 |
| AT | 521 961 A4 | 7/2020 |

(Continued)

OTHER PUBLICATIONS

Chinese Search Report dated Jul. 20, 2022 in Chinese Application No. 2020800130691 (in Chinese).

(Continued)

*Primary Examiner* — S. Joseph Morano
*Assistant Examiner* — Heaven R Buffington
(74) *Attorney, Agent, or Firm* — Collard & Roe, P.C.

(57) ABSTRACT

In a transport carrier system for an overhead conveying device, a transport carrier includes a universally applicable base body and a supporting body exchangeable using a connecting device. The supporting body in a first configuration has a completely enclosed receiving opening and is configured for transporting transport bags, and in a second configuration has a suspension hook and is configured for transporting an article suspended on a clothes hanger. The (Continued)

connecting device includes a profile groove and a profile projection each extending perpendicular to the longitudinal axis. The profile groove forms an undercut and has an insertion opening on the end side in the direction of its longitudinal extension. The profile projection includes a profile web and a profile head formed thereon so as to expand the cross section. Moreover, an overhead conveying device has such a transport carrier system.

24 Claims, 25 Drawing Sheets

(51) Int. Cl.
    *B65G 17/42*     (2006.01)
    *B65G 19/02*     (2006.01)
    *B65G 47/61*     (2006.01)
(52) U.S. Cl.
    CPC ........... *B65G 19/025* (2013.01); *B65G 47/61* (2013.01); *B65G 2201/0229* (2013.01)
(58) Field of Classification Search
    USPC .......................................................... 105/15
    See application file for complete search history.

(56) References Cited

U.S. PATENT DOCUMENTS

| | | | |
|---|---|---|---|
| 4,881,468 A | 11/1989 | Hafner et al. | |
| 5,404,992 A * | 4/1995 | Robu | B65G 19/025 198/465.4 |
| 6,601,690 B2 * | 8/2003 | Jephcott | B65G 67/20 198/465.4 |
| 7,441,999 B2 | 10/2008 | Nakao et al. | |
| 9,205,990 B2 | 12/2015 | Otto | |
| 11,084,658 B2 | 8/2021 | Stauber | |
| 2012/0001047 A1 | 1/2012 | Spichtig et al. | |
| 2014/0190793 A1 | 7/2014 | Otto | |
| 2019/0367282 A1 | 12/2019 | Stauber | |
| 2020/0024074 A1 | 1/2020 | Herzog-Lang et al. | |
| 2021/0155415 A1 | 5/2021 | Reischl et al. | |

FOREIGN PATENT DOCUMENTS

| | | | | |
|---|---|---|---|---|
| CH | 713 399 A1 | 7/2018 | | |
| CH | 713 405 A2 | 7/2018 | | |
| CN | 202642802 U | 1/2013 | | |
| CN | 204057058 U | 12/2014 | | |
| CN | 106542284 A | 3/2017 | | |
| CN | 106696970 A | 5/2017 | | |
| CN | 207791925 U | 8/2018 | | |
| CN | 110382376 A | 10/2019 | | |
| DE | 1803757 B1 | 6/1970 | | |
| DE | 3227736 A1 | 2/1983 | | |
| DE | 3605317 C1 | 2/1987 | | |
| DE | 9106795 U1 | 4/1992 | | |
| DE | 10 2004 018 569 A1 | 11/2005 | | |
| DE | 10 2005 006 455 A1 | 8/2006 | | |
| DE | 20 2010 008 717 U1 | 12/2010 | | |
| DE | 20 2017 106 993 U1 | 12/2017 | | |
| EP | 1 547 943 A1 | 6/2005 | | |
| EP | 1690811 A1 * | 8/2006 | ........... | B61B 10/025 |
| EP | 2 436 617 A1 | 4/2012 | | |
| EP | 2 554 497 A1 | 2/2013 | | |
| EP | 2 752 378 A1 | 7/2014 | | |
| EP | 3 028 960 A1 | 6/2016 | | |
| EP | 3 050 828 B1 | 10/2018 | | |
| FR | 2510504 A1 | 2/1983 | | |
| JP | S62-241758 A | 10/1987 | | |
| WO | 2010/012321 A1 | 2/2010 | | |
| WO | 2017/109042 A1 | 6/2017 | | |
| WO | 2018/130712 A2 | 7/2018 | | |
| WO | 2018/142242 A1 | 8/2018 | | |

OTHER PUBLICATIONS

International Search Report in PCT/AT2020/060037, mailed Nov. 6, 2020.

* cited by examiner

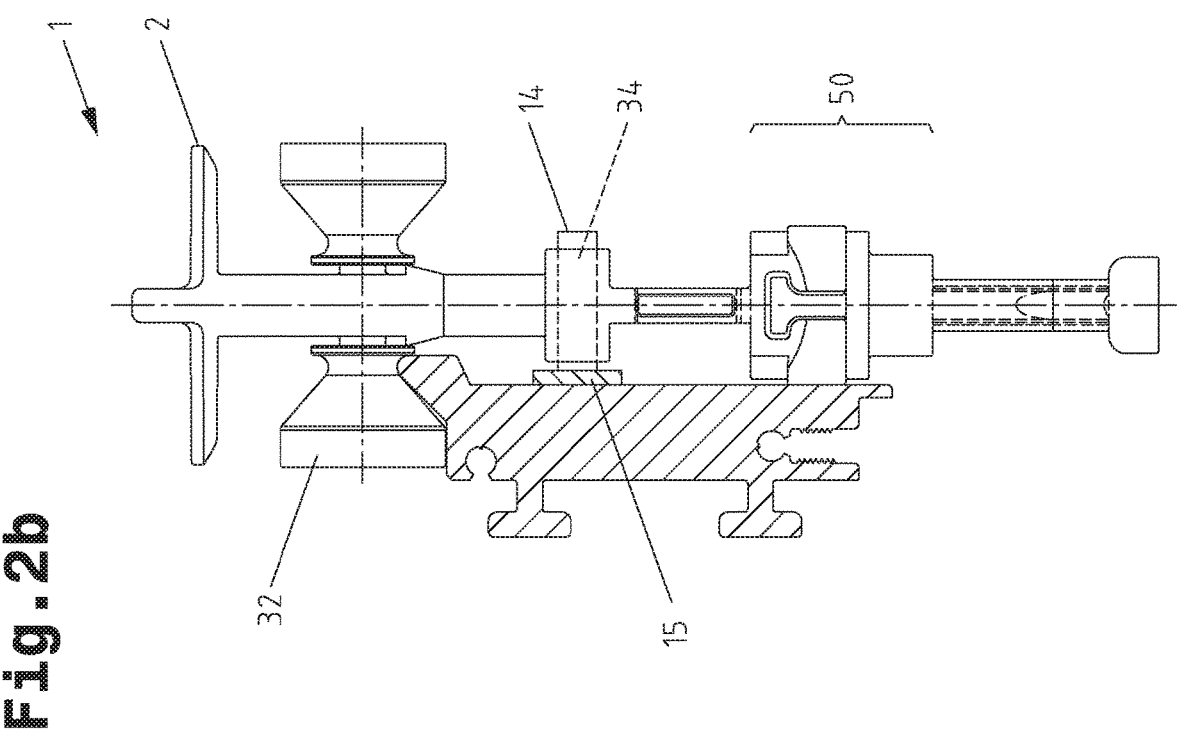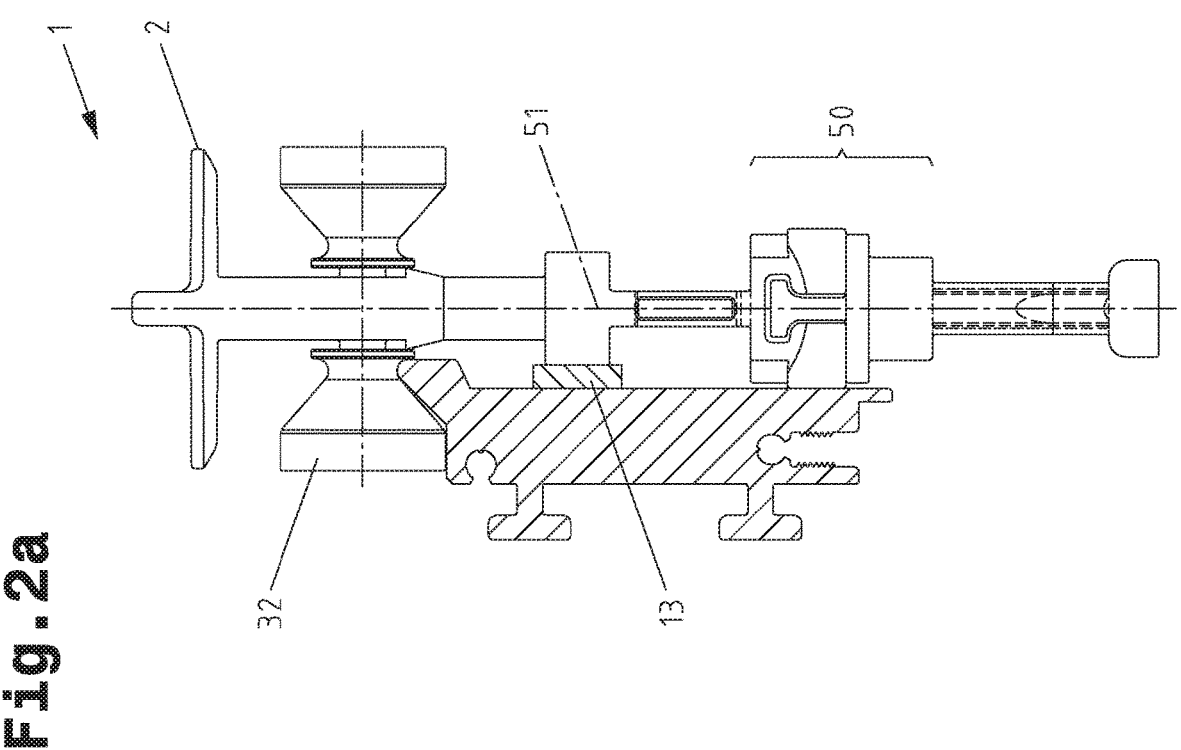

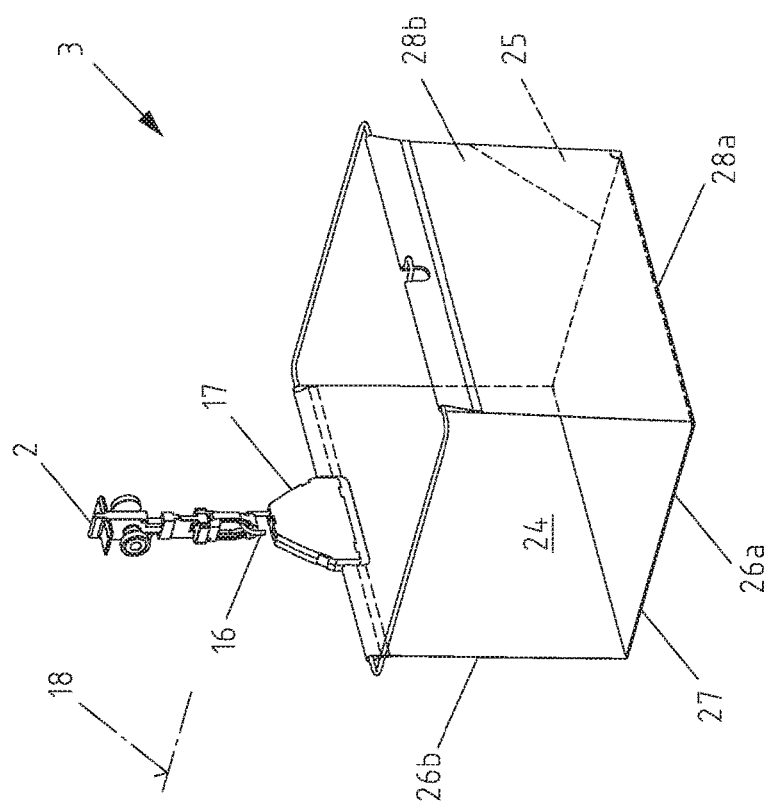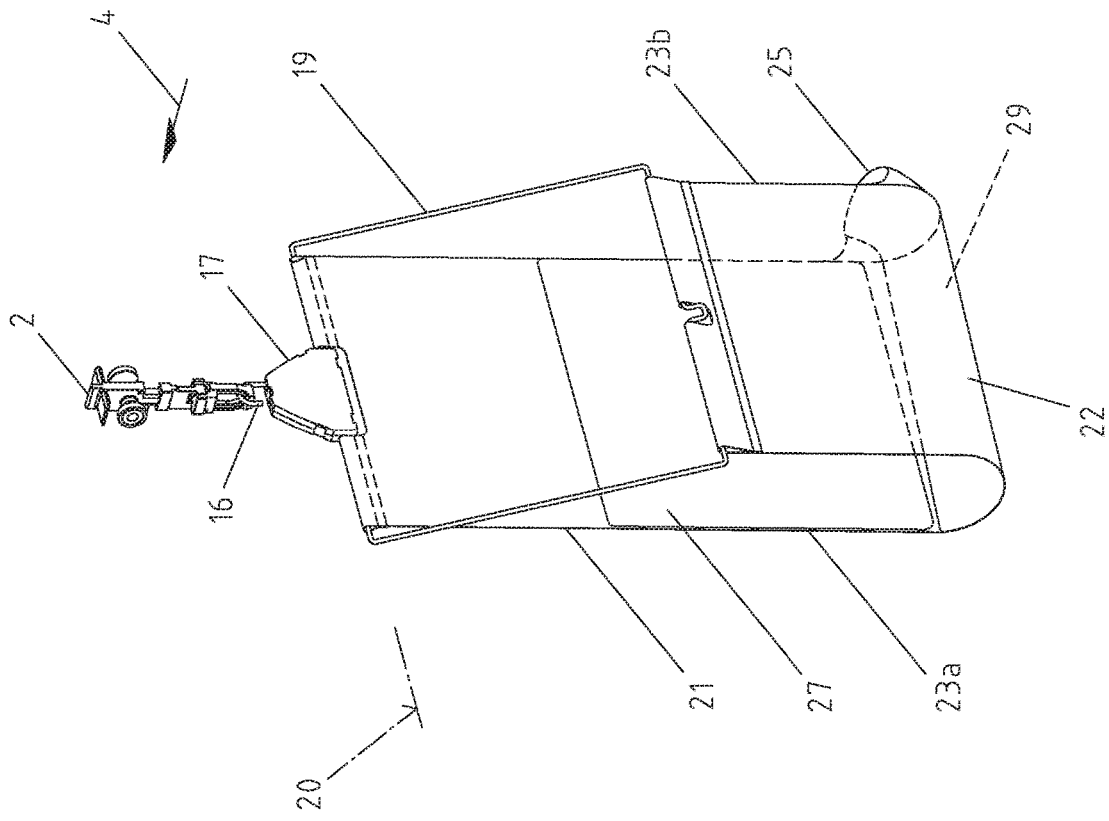

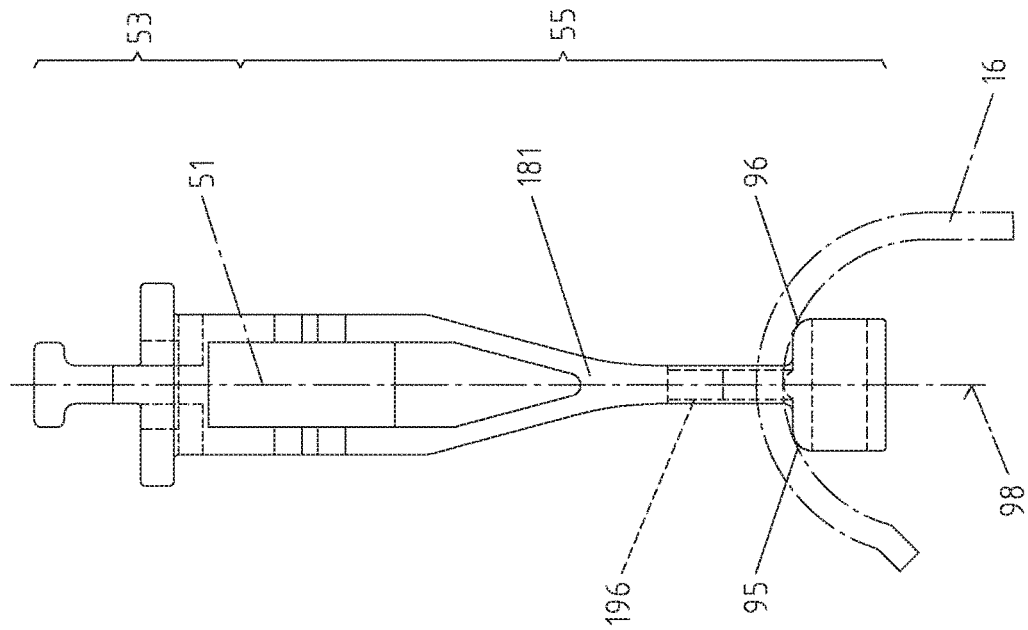
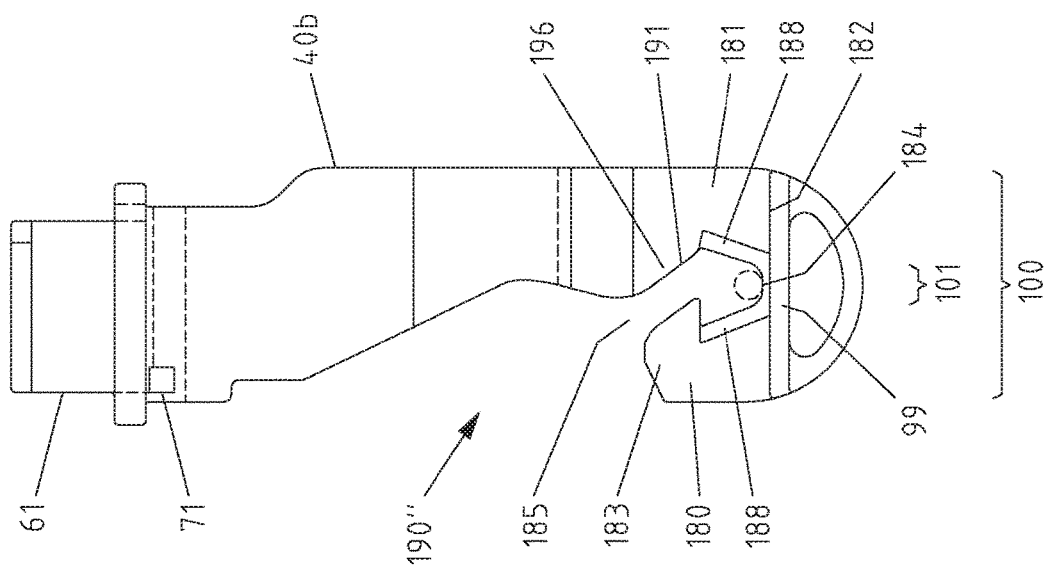
Fig. 4f
Fig. 4e

Fig.5a
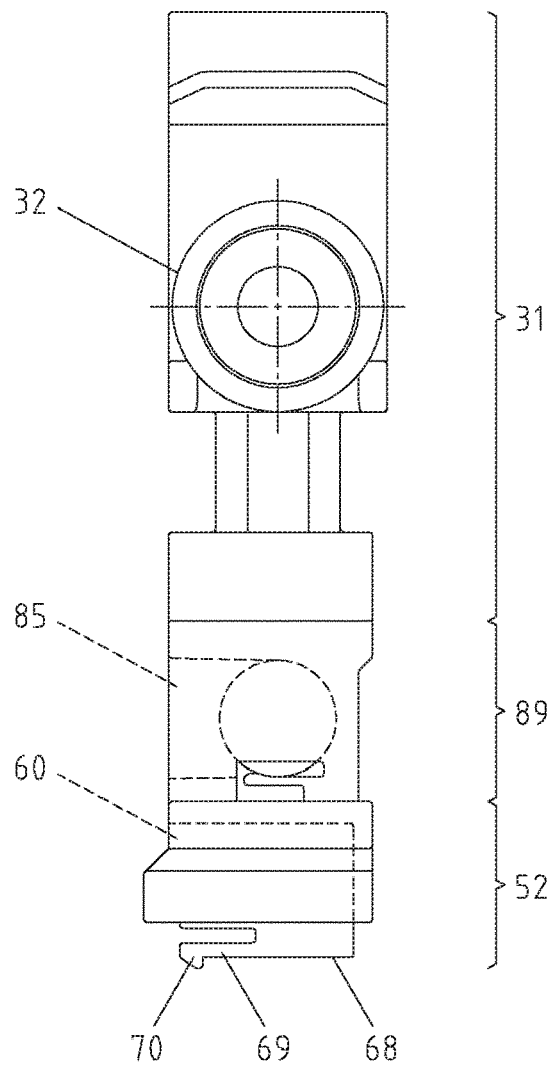
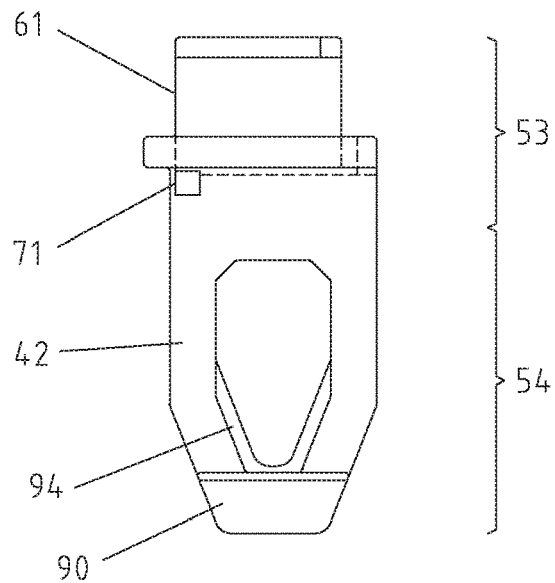
Fig.5b
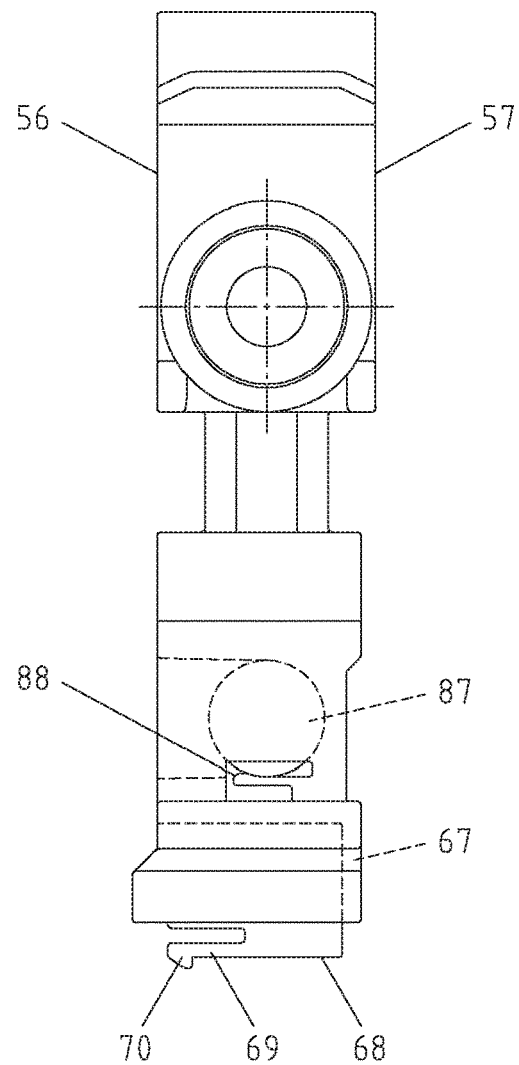
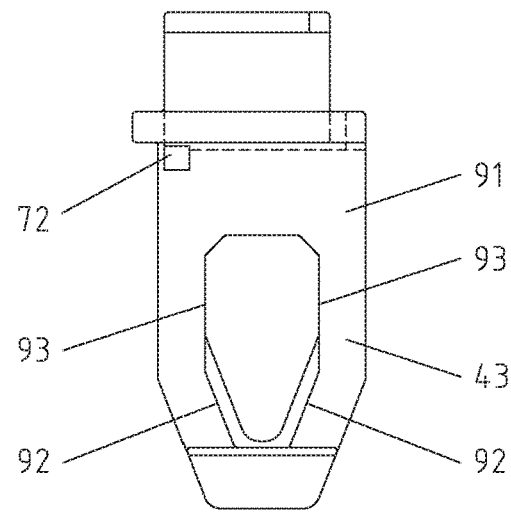

Fig.7a
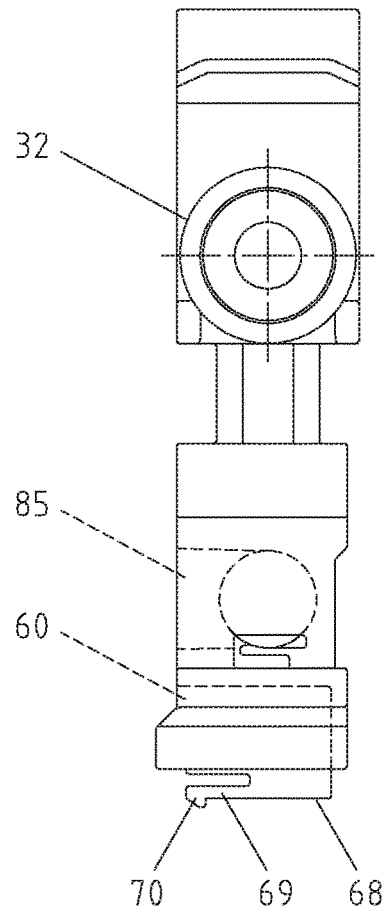
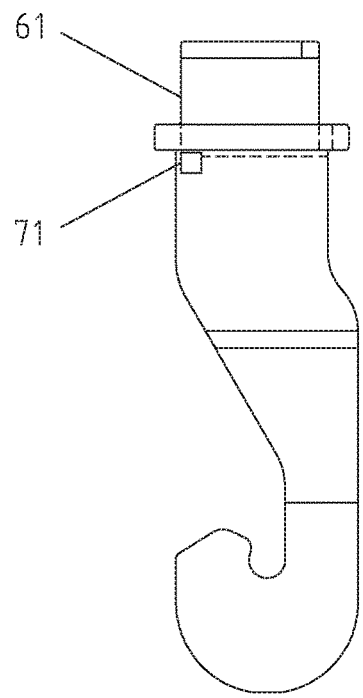
Fig.7b
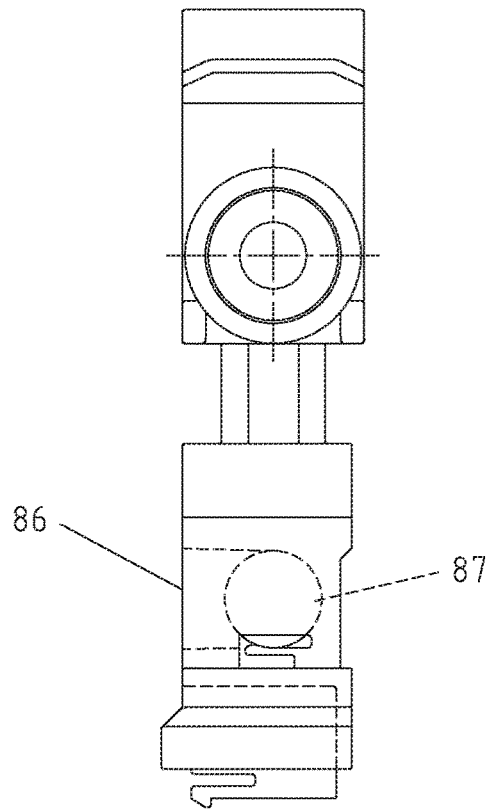
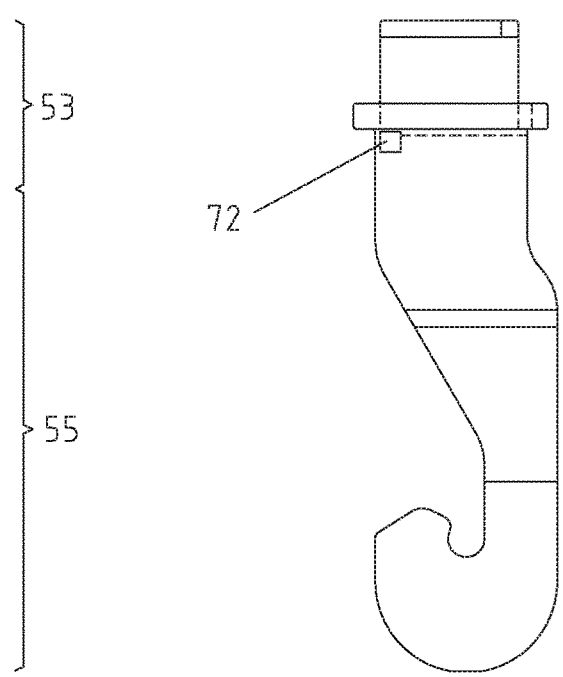

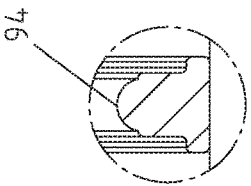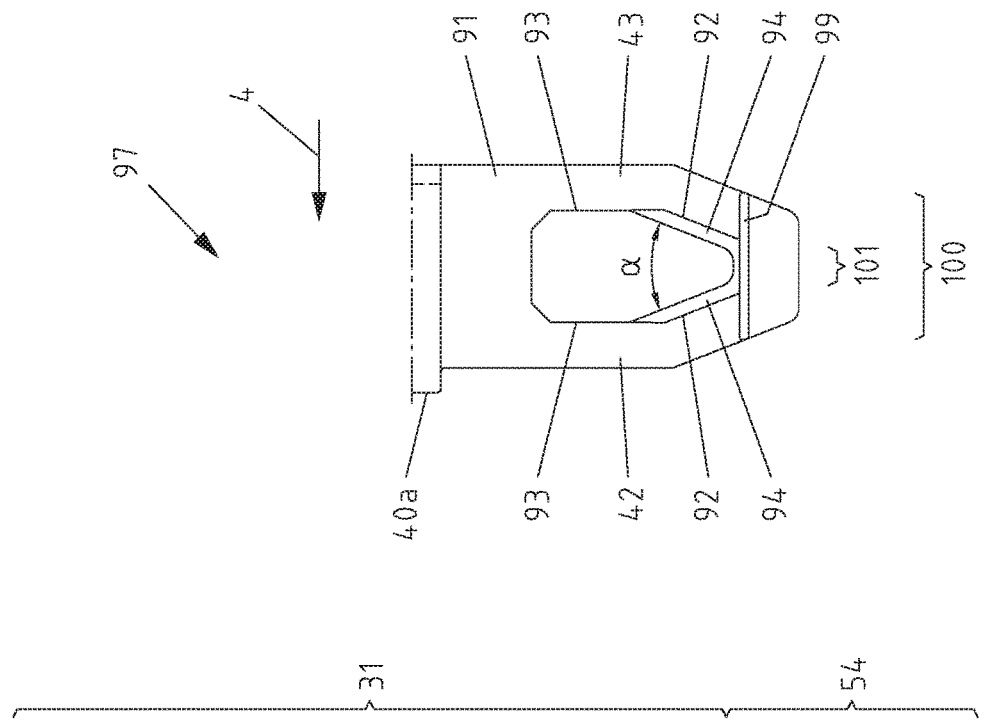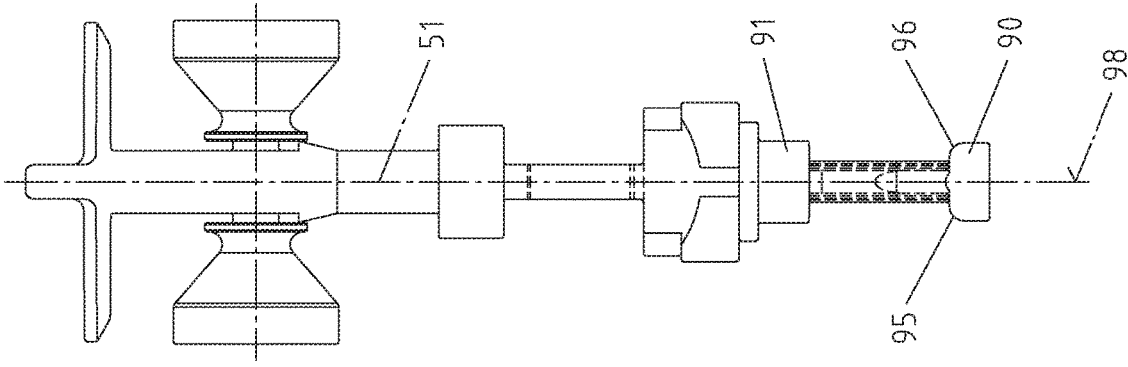

TRANSPORT CARRIER SYSTEM AND OVERHEAD CONVEYOR DEVICE COMPRISING TRANSPORT CARRIERS FOR TRANSPORTING SUSPENDED GOODS

CROSS REFERENCE TO RELATED APPLICATIONS

This application is the National Stage of PCT/AT2020/060037 filed on Feb. 7, 2020, which claims priority under 35 U.S.C. § 119 of Austrian Application No. A50092/2019 filed on Feb. 7, 2019, the disclosure of which is incorporated by reference. The international application under PCT article 21(2) was not published in English.

BACKGROUND OF THE INVENTION

1. Field of the Invention

The invention relates to a transport carrier, a transport carrier system for an overhead conveying device, and an overhead conveying device having transport carriers for transporting hanging articles.

2. Description of the Related Art

EP 3 028 960 A1 discloses an overhead conveying device with a drive device and transport carriers movable thereby for transporting hanging articles. Each of the transport carriers comprises a base body and a supporting body, which is exchangeably mounted on the base body by a connecting device, having a completely enclosed receiving opening for hooking in at least one hanger of a hanging article. The drive device is designed as a conveyor chain, and each chain link forms the base body. The supporting bodies can be exchanged when the conveyor chain is closed (thus without opening up the conveyor chain). The connecting device is designed as a plug connection. The plug connection preferably comprises at least one positive engagement element (locking lug) acting along an insertion direction of the plug connection. If the plug connection is designed without an additional positive engagement element (locking lug), the supporting body is mounted on the base body only by an accordingly designed force fit, so that the exchanging operation can only be executed with considerable effort. However, if the positive engagement element (locking lug) is additionally provided, it also has to absorb a weight force.

A comparable connecting device is disclosed in EP 3 050 828 B1.

Generally, a "hanging article" is understood to mean an article, which is transported suspended, for example, by a hanger. Classic examples of hanging articles are articles of clothing suspended on clothes hangers, or transport bags for receiving articles. In the present context, "hanging article" stands in contrast to "lying article". Lying articles are articles being transported resting on a ground, which moves. In contrast, hanging articles are suspended below the transport carriers and/or the overhead conveying device.

Different embodiments of transport bags are known from DE 10 2004 018 569 A1, DE 20 2017 106 993 U1 and WO 2018/130712 A2.

SUMMARY OF THE INVENTION

The object of the invention is to provide a transport carrier and a transport carrier system for an overhead conveying device with an improved connecting device between the base body and the supporting body. In particular, the supporting body is to be exchangeable from the base body with little effort and the simplest of technical means (tools). An object of the invention is to provide an overhead conveying device having transport carriers for transporting hanging articles, wherein the overhead conveying device can be adapted flexibly to different hanging articles and with little effort to changed requirements.

The object of the invention is achieved by the connecting device comprising a profile groove (first positive engagement element) extending perpendicular to the longitudinal axis in one of the base and supporting body connecting sections, and a profile projection (second positive engagement element) extending perpendicular to the longitudinal axis in one of the base and supporting body connecting sections, wherein the profile groove forms an undercut and an insertion opening on the end side in the direction of its longitudinal extension, wherein the profile projection comprises a profile web and a profile head formed on the profile web so as to expand the cross-section, and wherein the profile projection can be inserted into the profile groove via the insertion opening in an insertion direction oriented perpendicular to the longitudinal axis.

The connecting device comprises positive engagement elements of a positive connection, which are designed to complement each other and which mesh with each other, when the supporting body is mounted on the base body. In this regard, the positive engagement elements are formed to be rigid. Such rigid positive engagement elements are easy to produce and the connecting device can thus be produced in a cost-effective manner. Moreover, rigid positive engagement elements are more durable and less prone to defects due to frequent exchanging operations. The first positive engagement element (undercut profile groove) is arranged in the supporting body connecting section, and the second positive engagement element (profile projection) is arranged in the base body connecting section. Conversely, the first positive engagement element (undercut profile groove) may be arranged in the base body connecting section, and the second positive engagement element (profile projection) may be arranged in the supporting body connecting section. In a preferred embodiment, the first positive engagement element (undercut profile groove) and the second positive engagement element (profile projection) are designed to have an essentially T-shaped cross-section. Otherwise, the first positive engagement element is a profile groove with a hollow-cylindrical undercut, and the second positive engagement element is a profile projection with a cylindrical profile head, the diameter of which is greater than the width of the profile web. In the context of the invention, the first positive engagement element and the second positive engagement element may also form different cross-sectional shapes.

Such a positive connection is also distinguished by the fact that the profile projection can be inserted into the profile groove by an insertion movement oriented perpendicular to the longitudinal axis. The insertion movement can be executed with little effort and without additional tools. In particular, the positive connection can be established regardless of whether a particular joining force is reached or even exceeded, as it is the case for force-fitted connecting devices.

The positive engagement elements are also suitable for establishing a connection between the base body and the supporting body, which is loadable in particular with respect to rotational movements (about a vertical axis) and tensile stress (in the direction of a vertical axis due to a weight force). The connection is torsionally rigid and stable, even if the supporting body is exchangeably mounted on the base body by a single connecting device.

The connecting device allows quickly exchanging the supporting bodies, mostly without additional tools.

Regardless of the configuration of the (different) supporting bodies, it is possible to always (universally) use the same base body configured in an optimized manner. While the base body can/has to model a variety of functions, the supporting bodies only assume one single function.

Hence, the base body comprises the drive section, which comprises, for example, at least one guide roller, which abuts along a guide device of the overhead conveying in a rollable manner, and at least one engagement section, which cooperates with a drive device of the guide roller and is acted upon by a driving force. The drive section may also be equipped with a stop, for example on a front side of the transport carrier, with which stop a first transport carrier runs against a stopper element, for example, and/or be equipped with a stop, which is provided, for example, on a rear side of the transport carrier, with which stop a second transport carrier runs against a first transport carrier. Thus, the drive section may realize the functions "guiding the transport carrier", "moving the transport carrier" and/or "positioning the transport carrier". If the base body is additionally provided with an identifying means, the base body also takes on the function "identifying the transport carrier".

Regardless of their configurations, the supporting bodies, however, exclusively take on the function "receiving the hanging article".

Different supporting bodies, however, have a base body connecting section with a uniform (identical) first positive engagement element or second positive engagement element.

Preferably, the base body is made of plastic and produced in one piece using injection molding. Preferably, the supporting bodies are made of plastic and produced in one piece using injection molding. It may prove advantageous if the material properties of the base body and the supporting body differ. In particular, the plastic material of the base body may have better mechanical properties, such as strength, impact toughness, deformability, and the like, than the plastic material of the supporting body/the supporting bodies used. Different supporting bodies may use different shapings and/or different material properties. For example, in a first configuration, the supporting body may be designed with a completely enclosed receiving opening, and in a second configuration, with a suspension hook. The supporting body may have different material properties in a first configuration and in a second configuration. For example, in a first configuration, the supporting body is designed to have a higher material density than the supporting body in a second configuration. Otherwise, the supporting bodies may have different material properties in a first configuration with a suspension hook, and/or the supporting bodies may have different material properties in a second configuration with a completely enclosed receiving opening.

Depending on the transport requirements, only the supporting body is to be exchanged while the base body remains the same. If the hanging article is an article of clothing suspended on a clothes hanger, preferably, the supporting body in the second configuration with a suspension hook is used, and if the hanging article is a transport bag, preferably, the supporting body in the first configuration with a suspension hook having a completely enclosed receiving opening is used.

According to an embodiment of the invention, it is provided that the profile groove is arranged in the supporting body connecting section, and the profile projection is arranged in the base body connecting section. The second positive engagement element (profile projection) tends to be smaller in size than the first positive engagement element (profile groove). If the second positive engagement element (profile projection) is provided in the base body connecting section on the supporting body, the supporting bodies can be kept in "stock" in a more space-saving manner.

According to an advantageous embodiment, the transport carrier comprises a front wall and a rear wall, and the profile groove extends from the front wall in the direction of the rear wall. The profile groove extends over a length starting from the front wall and preferably ends shortly before the rear wall. The supporting body connecting section, if the (undercut) profile groove is provided therein, or the base body connecting section, if the (undercut) profile groove is provided therein, has a greater length compared to the (undercut) profile groove, so that a material web remains on the profile groove end adjoining the rear wall. The profile groove end adjoining the front wall forms the insertion opening, which opens into the front wall. Thereby, an insertion direction for the supporting body is specified and an incorrect orientation of an exchanged supporting body is prevented, which would be disadvantageous especially in the case of asymmetrical transport carriers. The material web may generally also serve as an insertion limit (rigid stop), against which the profile web abuts when it has been inserted completely into the profile groove.

If the profile groove is continuously opened toward the supporting body and along its longitudinal extension, a cross-sectional contour can be produced easily, in particular by injection molding. It also proves advantageous that after removing a supporting body via the opened profile groove itself, the undercut is easily accessible, and the profile groove can be cleaned. This allows removing contaminants in the profile groove, so that a reliable connection between the base body and supporting body is ensured even after frequent exchanging operations.

According to a particularly advantageous embodiment, it is provided that the connecting device comprises mutually engageable locking elements, which are arranged and configured such that the base body and supporting body are mutually locked against displacement in the longitudinal direction of the profile groove, if the exchangeable supporting body is mounted on the base body. The locking elements serve to lock the relative position between the base body and the supporting body. In particular, the locking elements become effective when joining the base body and the supporting body, as they are automatically brought into engagement in the displacement movement.

Preferably, the locking elements comprise first locking elements configured as elastically resilient spring arms, each having a locking lug formed on a spring clip, in one of the base and supporting body connection sections on both sides of the profile groove, and second locking elements configured as locking openings arranged in one of the base and supporting body connection sections on both sides of the profile web. The first locking elements (flexible spring arms with one locking lug each) are arranged in the supporting body connecting section, and the second locking elements (locking openings) are arranged in the base body connecting section. Conversely, the first locking elements (flexible spring arms with one locking lug each) may be arranged in the base body connecting section, and the second locking elements (locking openings) may be arranged in the supporting body connecting section. The spring arms are each elastically bendable in a bending direction extending perpendicular to their main direction of extension and are provided with locking lugs protruding in the bending direction on a spring clip. In the engagement position of the locking elements, the locking lugs are made to abut on an edging of the locking opening.

According to an embodiment, it is provided that the connecting device comprises receiving slots arranged in one of the base body and supporting body connecting sections on both sides of the profile web, wherein each of the receiving slots has a support surface extending in the insertion direction of the supporting body and a locking opening arranged in a rear end region in the insertion direction of the supporting body. The receiving slots are arranged in the base body connecting section if the spring arms are provided in the supporting body connecting section. Conversely, the receiving slots may be provided in the supporting body connecting section if the spring arms are provided in the base body connecting section. If the supporting body is moved relative to the base body in the insertion direction perpendicular to the longitudinal axis, the spring arms are, for example, bent inwards by the locking lugs resting on the support surfaces (in a sliding manner), and relax outwards, as soon as the locking lugs have passed the edging of the locking openings. If the locking lugs have an inclined shape, in particular a sawtooth shape, the supporting body can no longer be removed easily from the base body against the insertion direction, as the locking lugs enter into a positive connection with the edging of the locking opening.

The positive connection can be released by the spring arms being deflected in a bending direction extending perpendicular to their main direction of extension such that the locking lugs are brought out of engagement with the edging of the locking openings. Simultaneously, the supporting body is moved towards the longitudinal axis, against the insertion direction in a perpendicular direction.

For this purpose, the connecting device may have access channels, which the locking openings lead into. Preferably, a tool may be introduced into the access channels, and with that, the locking lugs may be levered out of the locking openings. A screwdriver suffices as a tool.

An embodiment, in which the supporting body is equipped with a completely enclosed receiving opening in a first configuration, or with a suspension hook in a second configuration, is also advantageous.

The configuration of different supporting bodies is a reaction to the increasing requirements for flexibility of storage and order-picking systems. Especially in e-commerce in the textile industry, an enormously high proportion of returns is to be expected. Especially regarding returns, it has proven advantageous if the returned articles are stored, sorted, and picked with an overhead conveyor system. The articles are manipulated as hanging articles. Hanging articles are articles of clothing suspended on clothes hangers, or transport bags for receiving articles. The transport bags allow manipulating an almost unlimited range of articles. The articles (such as shoes, shirts, sweaters, T-shirts, accessories) are packed in cardboard boxes, polybags, and the like, for example.

In the light of this, supporting bodies can be used in a first configuration with a suspension hook or in a second configuration with a completely enclosed receiving opening. Supporting bodies in a first configuration with a completely enclosed receiving opening transport the suspended transport bags (hanging bags), which accommodate the articles. Supporting bodies in a second configuration with a suspension hook transport articles of clothing on clothes hangers.

It may also prove advantageous if the supporting body additionally comprises
- a front side wall running essentially in parallel to the longitudinal axis,
- a rear side wall running essentially in parallel to the longitudinal axis,
- a lower side wall extending between the front side wall and rear side wall,
- a receiving section for a hanger of the hanging article, formed by the front side wall, rear side wall and lower side wall,
- an access channel leading into the receiving section and allowing the hanger of the hanging article to be inserted into the receiving section,
- guide edges provided on the front side wall and rear side wall in lower wall sections and tapered towards each other in the direction toward the lower side wall, and
- a transport lock arranged above the receiving section with a vertical distance and forming a stop surface, the stop surface limiting or impeding a relative shift of the hanger in the direction toward the transport lock.

Thereby, a "rising" of the hanger on a guide edge can be permitted to a limited extent on the one hand, and on the other hand, a "de-threading" of the hanger out of the receiving section via the access channel can be avoided. The transport of the hanging articles on hangers can thus be executed in a reliable manner, and even at high transport speeds, the loss of hanging articles can be prevented.

The transport lock is primarily used for a supporting body in a second configuration with a suspension hook for transporting articles of clothing on clothes hangers.

Advantageous embodiments of the transport lock are described in the following and are not cited again at this point.

It may also prove advantageous if the base body comprises a receiving chamber extending perpendicular to the longitudinal axis and having an opening slot formed on the end side in the direction of its longitudinal extension, and an identifying means, in particular a transponder, which can be inserted into the receiving chamber via the opening slot. The receiving chamber forms a receiving plane, which extends in the conveying direction of the transport carrier. Thus, the identifying means is also oriented transversely to the conveying direction, meaning to the side, with its main surface. Thus, reading errors can be virtually precluded. An overlap with other identifying means can also be avoided. The identifying means preferably is an RFID transponder (radio frequency identification). The identifying means serves, for example, for storing identification information regarding the transport carrier and possibly regarding the hanging article transported by the transport carrier. Furthermore, information regarding the transport path traveled and/or to be traveled may be stored in the identifying means configured as a data storage element. This information may be used to control the material flow.

According to an embodiment of the invention, it is provided that the receiving chamber comprises a base opened toward the supporting body and an elastically resilient spring arm, which spring arm has a rest surface and protrudes in the direction toward the base, so that the identifying means, in particular the transponder, is supported on the rest surface in the receiving chamber and is held by the spring arm. The identifying means is not arranged to be permanently integrated in the base body but may be exchanged if needed (defect, changeover to new transponder technology).

It is also advantageous if the receiving chamber and the identifying means, in particular the transponder, are arranged between the drive section and the supporting body connecting section. Hence, a reliable reading operation is possible.

The object of the invention is also achieved in that the overhead conveying device comprises multiple transport carriers, wherein all transport carriers or at least some of the transport carriers comprise a supporting body for transporting a hanging article, which supporting body is exchangeably mounted on the base body by a connecting device. Thus, some of the transport carriers may be formed in one piece, in which the base body and the supporting body are permanently (not releasably) connected. In particular, it is possible to keep the guide device in an overhead conveying section, in which a drive device is not provided, or the guide device and drive device in an overhead conveying section, in which a drive device is also provided, and the base bodies of the transport carriers unchanged. Only the supporting bodies have to be exchanged in order to be able to use the overhead conveying device in a more versatile manner. This modification can be executed quickly and easily.

It is also advantageous if the transport carriers can be coupled to and uncoupled from the guide device or to/from the guide device and to/from the drive device. In other words, the drive section of the transport carriers is designed such that the transport carrier (and not just the supporting body) can be removed from the guide device or guide device and drive device without additional installation steps. Thereby, the overhead conveying device can continue to be operated, and exchanging or modifying the transport carriers requires only a short downtime.

It is also advantageous if the lower side wall of the supporting body comprises a first rest section and a second rest section, wherein the first rest section and the second rest section are arranged on both sides of a midplane spanned between the front side wall and rear side wall and each offset at a distance from the midplane, such that for transporting the hanging article on the transport carrier, the hanger is positioned between the guide edges and can be supported on the first rest section and second rest section.

If the unloading of the hanging article (transport bag) on an automatic unloading station described below is also provided, the hanger may be positioned between the guide edges and be mounted (so as to slide) on the first rest section and second rest section, when the hanging article (transport bag) is pivoted between a provisioning position and an unloading position.

The (bent) hanger of the hanging article (clothes hanger or transport bag) is thus supported on more than one rest section, namely at least on a first rest section and second rest section. The first rest section and second rest section are arranged at a distance, which is adapted to a curvature radius of the hanger, in a transport plane extending transversely, in particular perpendicular, to the transport direction (of the hanging article) between the front and rear side wall and essentially vertically.

Pivoting and wobbling movements of the hanging article suspended on a transport carrier are reduced to an extent, which allows a higher transport speed. Moreover, due to the reduced frictional wear, the transport carrier can be used for a longer time than is possible in the prior art.

It may also prove advantageous if the guide edges enclose between them an opening angle of less than 90°. This is more likely to prevent a "rising" of the hanger on the guide edges than with opening angles of more than 90°, as is common in the prior art. Thereby, pivoting, and wobbling movements can be additionally minimized. Likewise, a twisting of the hanger and/or the hanging article about a vertical axis can be reduced to a minimum. This additionally contributes to a stabilizing transport of the hanging article and/or a reliable unloading of the transport bag.

According to an advantageous embodiment, the guide edges each form a rounded guide surface. Thereby, a frictional wear on the guide edges can be minimized.

It also proves advantageous if the first rest section and second rest section comprise edges extending in parallel to each other, whose minimum length is greater than a minimum opening width between the guide edges. Thereby, the support of the hanger on the first rest section and second rest section remains in place even upon a twisting of the hanger and/or the hanging article about a vertical axis. If, on one hand, the hanger "rises" on a guide edge, and the hanging article inclines laterally relative to the vertical, the hanger can still be supported on the guide edge and at least one of the relevant first and second rest sections. If, on the other hand, the hanger "rises" but the hanging article hangs essentially parallel to the transport plane or be only slightly inclined laterally relative to the vertical, the hanger can be supported on the guide edge, the first rest section and second rest section.

If each of the edges has a rounded rest surface, a particularly good adaptation to the curvature radius of the hanger and thus, an improved support of the hanger on the first rest section and second rest section is achieved.

In regard to the different advantageous embodiments described herein, reference is made to the above descriptions.

It may also prove advantageous if the supporting body additionally forms a transport lock, which is arranged above the receiving section with a vertical distance, and forms a stop surface, which stop surface limits or impedes a relative shift of the hanger in the direction toward the transport lock. Thereby, a "rising" of the hanger on a guide edge can be permitted to a limited extent on the one hand, and on the other hand, a "de-threading" of the hanger out of the receiving section via the access channel can be avoided. The transport of the hanging articles on hangers can thus be executed in a reliable manner, and even at high transport speeds, the loss of hanging articles can be prevented.

It is a particularly advantageous embodiment if the transport lock has an elastically resilient spring arm arranged on the rear side wall, which spring arm has a spring clip and a stop arranged on the protruding end, wherein the stop protrudes into the access channel and forms the stop surface on its side wall facing the receiving section. The transport carrier can be loaded particularly easily, and the hanging article can be transported particularly reliably. If the transport carrier is to be equipped with a hanging article, the hanger is supplied to the access channel. By the weight force alone, the hanger pushes (displaces) the spring clip (out of a locked position) so far from the access channel in the direction toward the rear side wall (into a release position), that it can be moved downward in the direction toward the receiving section. As soon as the spring clip has been "released" by the hanger, the spring clip is moved out of the deflected release position back into the locked position. In the locked position, a "rising" of the hanger on a guide edge is blocked by the stop. The vertical distance between the transport lock and the receiving section is preferably designed such that even in the highest hanger position, the hanger can be supported on the guide edge and possibly on at least one of the relevant first and second rest sections. If the hanging article is to be removed from the transport carrier, the hanger is pivoted about an axis extending in the transport direction and moved out laterally of the receiving section.

The elastically resilient spring arm is made from plastic and is produced in one piece with the supporting body by injection molding. Likewise, however, it is also possible that the elastically resilient spring arm is produced separately from the supporting body, preferably from metal, and the supporting body is produced separately from the spring arm by injection molding. The spring arm is connected to the supporting body on the rear side wall, for example by a positive and/or force-fitted connection. A materially bonded connection is also possible. The elastically resilient spring arm forms a flat spring clamped on one side.

According to a further embodiment, it may be provided that the rear side wall and the spring clip comprise guide elements, which can be brought into engagement with each other. According to a possible embodiment, the spring clip may be provided with a first guide element and a second guide element. Preferably, the first guide element and second guide element project from the spring clip in the direction toward the rear side wall. If the first guide element and second guide element are provided, they can, on one hand, be located opposite each other and be arranged symmetrically relative to a longitudinal axis of the spring clip. If the first guide element and second guide element are provided, they can, on the other hand, be located opposite each other and be arranged so as to be offset from each other in the direction of a longitudinal axis of the spring clip. According to a possible embodiment, the first guide element and second guide element may be arranged in the end region of the spring clip and extend at maximum over a third of the length of the spring clip. Specifically, the first guide element and second guide element form guide projections. According to a possible embodiment, the first guide element and second guide element may be arranged in the center and end region of the spring clip and extend at least over a third of the length of the spring clip.

According to a possible embodiment, the spring clip may, however, also be provided with a single guide element. Specifically, the guide element forms a guide pin.

According to a possible embodiment, the rear side wall may be provided with a first guide element and a second guide element. The first guide element of the spring clip and the first guide element of the rear side wall are designed to be complementary. Likewise, the second guide element of the spring clip and the second guide element of the rear side wall are designed to be complementary. If the first/second guide element of the spring clip are formed by guide projections, the first/second guide element of the rear side wall is formed by guide recesses. If the guide element of the spring clip is formed by a guide pin, the guide element of the rear side wall is formed by a guide bore.

If the spring clip is provided with a single guide element and the rear side wall is provided with a single guide element, the guide element of the spring clip and the guide element of the rear side wall are designed to be complementary.

In particular, it proves advantageous if the first/second guide elements engage with each other not only in the release position but also in the locked position of the spring clip, and thereby, the spring clip is supported laterally in the locked position/release position by the guide element(s) on the rear side wall.

In particular, it proves advantageous if the stop forms the first/second guide element, which are arranged on the spring clip.

It may also prove advantageous if the transport lock has an elastically resilient first spring arm arranged on the front side wall, which first spring arm a spring clip and a stop arranged on the protruding end, and an elastically resilient second spring arm arranged on the rear side wall, which second spring arm has a spring clip and a stop arranged on the protruding end, wherein the stops each protrude into the access channel and form the stop surfaces on a side wall facing the receiving section. According to this embodiment, the hanger is first transferred via the access channel to the elastically resilient first spring arm and elastically resilient second spring arm, which are consequently pushed apart as a result of the weight force of the hanger. By the weight force alone, the hanger pushes (displaces) the spring clip of the first spring arm (out of a locked position) so far from the access channel in the direction toward the front side wall (into a release position), and pushes (displaces) the spring clip of the second spring arm (out of a locked position) so far from the access channel in the direction toward the rear side wall (into a release position) that it can be moved in the direction toward the receiving section. As soon as the spring clips have been "released" by the hanger, the spring clips are each moved out of the deflected release position back into the locked position. In the locked position, a "rising" of the hanger on a guide edge is blocked by the stops. The vertical distance between the transport lock and the receiving section is preferably designed such that even in the highest hanger position, the hanger can be supported on the guide edge and possibly on at least one of the relevant first and second rest sections. If the hanging article is to be removed from the transport carrier, the hanger is pivoted about an axis extending in the transport direction and moved out laterally of the receiving section. It may also prove advantageous if the transport lock comprises a raised area arranged on the rear side wall, which raised area protrudes into the access channel and forms the stop surface. According to this embodiment, a raised area is provided, which is designed to be essentially rigid, in contrast to the above embodiments with an elastically resilient spring arm, or an elastically resilient first spring arm and an elastically resilient second spring arm. The raised area forms an "interfering contour" in the access channel, impeding a relative shift of the hanger in the direction toward the transport lock. Thereby, a "rising" of the hanger on a guide edge can be permitted to a limited extent on the one hand, and on the other hand, a "de-threading" of the hanger out of the receiving section via the access channel can be hindered. The guide edge and the raised area run into each other (adjoin each other) and enclose an angle, in particular an angle smaller than 150°. Thereby, a hanger "rising" on a guide edge is reverted in the direction of movement at the stop surface.

The object of the invention is also achieved in that the overhead conveying device comprises a plurality of the transport carriers described above.

In this regard, the transport carriers may be formed in one piece, in which the base body and the supporting body are permanently (not releasably) connected. Otherwise, the transport carriers may comprise a supporting body for transporting a hanging article, which is exchangeably mounted on the base body by a connecting device, as described above. It proves particularly advantageous that, by using the transport carrier according to the invention, the hanging article on the overhead conveying device can be driven or be transported at a higher transport speed by gravity. Thereby, a high transport capacity is achieved. Moreover, faults while transporting the hanging articles can be largely prevented.

It is also advantageous if an unloading device for automatic unloading a transport bag loaded with at least one article comprises
  an overhead conveying device for transporting the transport bag into the unloading station and for transporting the transport bag out of the unloading station,
  an opening and closing device for adjusting the bag body between a transport position (closed position) position and an unloading position (opened position), and
  an unloading device for unloading the transport bag, wherein the unloading device comprises an actuation device, by means of which the transport bag along with the bag body can be tilted relative to the transport carrier and about a tilting axis extending essentially in parallel to the longitudinal extension of the overhead conveying device between a provisioning position and an unloading position, wherein in the unloading position, the article can be discharged from transport bag through an unloading opening of the transport bag.

By using the transport carrier described above, it is now possible that, in the unloading position of the transport bag, the (bent) hanger of the hanging article (the transport bag) is supported on more than one rest section, namely on the first rest section and second rest section. Thus, a reliable automatic unloading operation is made possible.

For unloading an article from the transport bag
  i) in one step, the bag body is adjusted from the transport position (closed position) into the loading and/or unloading position (opened position) by the opening and closing device, and
  ii) in one step, the transport bag along with the bag body is tilted relative to the transport carrier and about a longitudinal axis extending essentially in parallel to the longitudinal extension of the overhead conveying device from a provisioning position into an unloading position by the unloading device, whereby the article is discharged from the transport bag through the unloading opening.

The discharge direction of the article extends in a discharge plane extending transversely to the transport direction of the transport bag. The article can hence be transported across an only very short discharge path, which significantly reduces the discharge time as compared to the unloading stations known from the prior art. Moreover, it is possible to place a take-over plane, onto which the article is to be discharged, essentially at the level of the unloading opening, such that a particularly gentle transfer of the article to the take-over plane is possible. The take-over plane is for example defined by a conveying device. The bag body can be adjusted into the unloading position prior to the tilting of the transport bag from the provisioning position into the unloading position, or the transport bag is already adjusted from the provisioning position into the unloading position into the unloading position during the opening operation of the bag body into the unloading position.

It is favorable for the opening and closing device to comprise an actuation device for automatic opening and closing of a bag body of the transport bag, by means of which actuation device the frame can be pivoted about an axis relative to a suspended support of the transport bag such that the bag body can be adjusted between the transport position (closed position) and the loading and/or unloading position (opened position).

The bag body can be adjusted between the transport position and the loading and/or unloading position by a frame of the transport bag. This results in a particularly simple structure of the transport bag. The opening and closing device can also be designed particularly simply.

It also proves to be particularly advantageous if the actuation device comprises a driver mechanism having
  an inlet section aligned upstream in a transport direction of the transport bag,
  an outlet section aligned downstream in the transport direction of the transport bag, and
  an unloading section arranged between the inlet section and the outlet section, wherein the inlet section forms a tilted guide track that can be brought into an abutting contact with the frame such that the frame is pivoted during the transport of the transport bag into the unloading station, whereby the bag body is adjusted from the transport position into the loading and/or unloading position.

The driver mechanism does not require a drive and is thus structured simply. The inlet section comprises a tilted guide track that can be brought into an abutting contact with the frame such that the frame is adjusted between different tilting positions and, in the course of this, the bag body is adjusted from the transport position into the loading and/or unloading position. The adjustment between the transport position and the loading and/or unloading position can be executed very gently. The transport bag is handled with care. Moreover, the continuous opening operation of the bag body allows the article to be centered in the storage space, which facilitates the discharge of the article from the good container.

It is also advantageous if the unloading section forms an essentially horizontal guide track that can be brought into an abutting contact with the frame such that the frame is held in the pivoted deflection position during the unloading operation, whereby the bag body also remains in the opened position.

The transport bag can be guided during its tilting movement. The guide track extends in parallel to the transport direction of the transport bag, as does a tilting axis.

It also proves to be advantageous if the outlet section forms a tilted guide track that can be brought into an abutting contact with the frame such that the frame is pivoted during the transport of the transport bag out of the unloading station, whereby the bag body is adjusted from the loading and/or unloading position into the transport position.

The outlet section comprises a tilted guide track that can be brought into an abutting contact with the frame such that the frame is adjusted between different tilting positions and, in the course of this, the bag body is adjusted from the loading and/or unloading position (opened position) into the transport position (closed position). The adjustment between the loading and/or unloading position and the transport position can be executed very gently. The transport bag is handled with care.

It proves to be favorable if the overhead conveying device, for the transport of the transport bag into the unloading station and for the transport of the transport bag out of the unloading station, comprises transport carriers movable by a drive device or by gravity, wherein the transport carrier and the suspended support are coupled to one another in an articulated manner, whereby the suspended support is pivotable about an axis extending essentially in parallel to the overhead conveying device relative to the transport carrier.

The transport carrier can be moved by a frictional drive or a form-fit drive. An embodiment in which the transport carriers can be moved autonomously by a self-propulsion is also possible. The transport carriers can be transported to the unloading station and away from the unloading station very dynamically, which promotes a high unloading performance.

However, the transport carriers can also be transported by gravity if the profile rail on which the transport carriers are moved has a slope. This embodiment is favorable where capital costs are to be kept low.

It can also be provided that a locking device for locking the transport carrier during an unloading operation of the transport bag is allocated to the opening and closing device of the unloading station.

The transport carrier is temporally locked for unloading of the transport bag, which allows for an unwanted movement of the transport carrier and the transport bag in a transport direction and/or transversely to the transport direction to be prevented during the tilting movement of the transport bag. The unloading process can also be executed particularly reliably for large and/or heavy articles.

It is also possible that the opening and closing device of the unloading station comprises a guide device for laterally guiding the transport carrier during a transport movement of the transport carrier through the overhead conveying device for transporting the transport bag into the unloading station and for transporting the transport bag out of the unloading station.

For unloading the transport bag, the transport carrier is guided laterally which prevents unwanted tilting of the transport carrier about an axis extending in a transport direction during the tilting movement of the transport bag. The unloading process can also be executed particularly reliably for large and/or heavy articles.

An advantageous design is also possible if the actuation device of the unloading device comprises a frame structure that can be tilted by a drive between an initial position and an actuation position about an axis extending in parallel to the transport direction of the transport bag and the actuation device of the opening and closing device is mounted on the frame structure.

The opening and closing device is moved together with the frame structure that can be tilted between the initial position and the actuation position, which allows for an opening operation of the bag body and the tilting operation of the transport bag to be executed simultaneously and/or for a closing operation of the bag body and the back-tilting operation of the transport bag to be executed simultaneously. The unloading operation can hence be accelerated additionally. Moreover, the unloading operation can be executed without stopping of the transport movement. However, in general, the transport speed of the transport carriers and the transport bag in the transport movement along the unloading station can vary.

BRIEF DESCRIPTION OF THE DRAWINGS

For the purpose of better understanding of the invention, it will be elucidated in more detail by the figures below.

These show in a respectively very simplified schematic representation:

FIG. 2a an overhead conveying device with a guide device and drive device for frictional drive of the transport carriers, in a front view and partially in a sectional view;

FIG. 2b an overhead conveying device with a guide device and drive device for positive engagement drive of the transport carriers, in a front view and partially in a sectional view;

FIGS. 3a, 3b a transport bag with a bag body, FIG. 3a in the transport position and FIG. 3b in the loading position or unloading position (article not depicted), in perspective views;

FIGS. 4e, 4f a supporting body with a third embodiment of a transport lock in different views;

FIG. 5a a first embodiment for a transport carrier with the base body and supporting body separated therefrom in a first configuration with a completely enclosed receiving opening, in a first lateral view;

FIG. 5b the transport carrier according to FIG. 5a, in a second lateral view;

FIG. 7a a transport carrier with the base body and supporting body separated therefrom in a second configuration with a suspension hook, in a first lateral view;

FIG. 7b the transport carrier according to FIG. 7a, in a second lateral view;

FIG. 8a a second embodiment for a transport carrier with a base body and supporting body permanently connected thereto in a first configuration with a completely enclosed receiving opening, in a front view;

FIG. 8b a partial section of the transport carrier according to FIG. 8a with the supporting body, in an enlarged lateral view;

FIG. 8c a sectional representation through the front side wall;

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
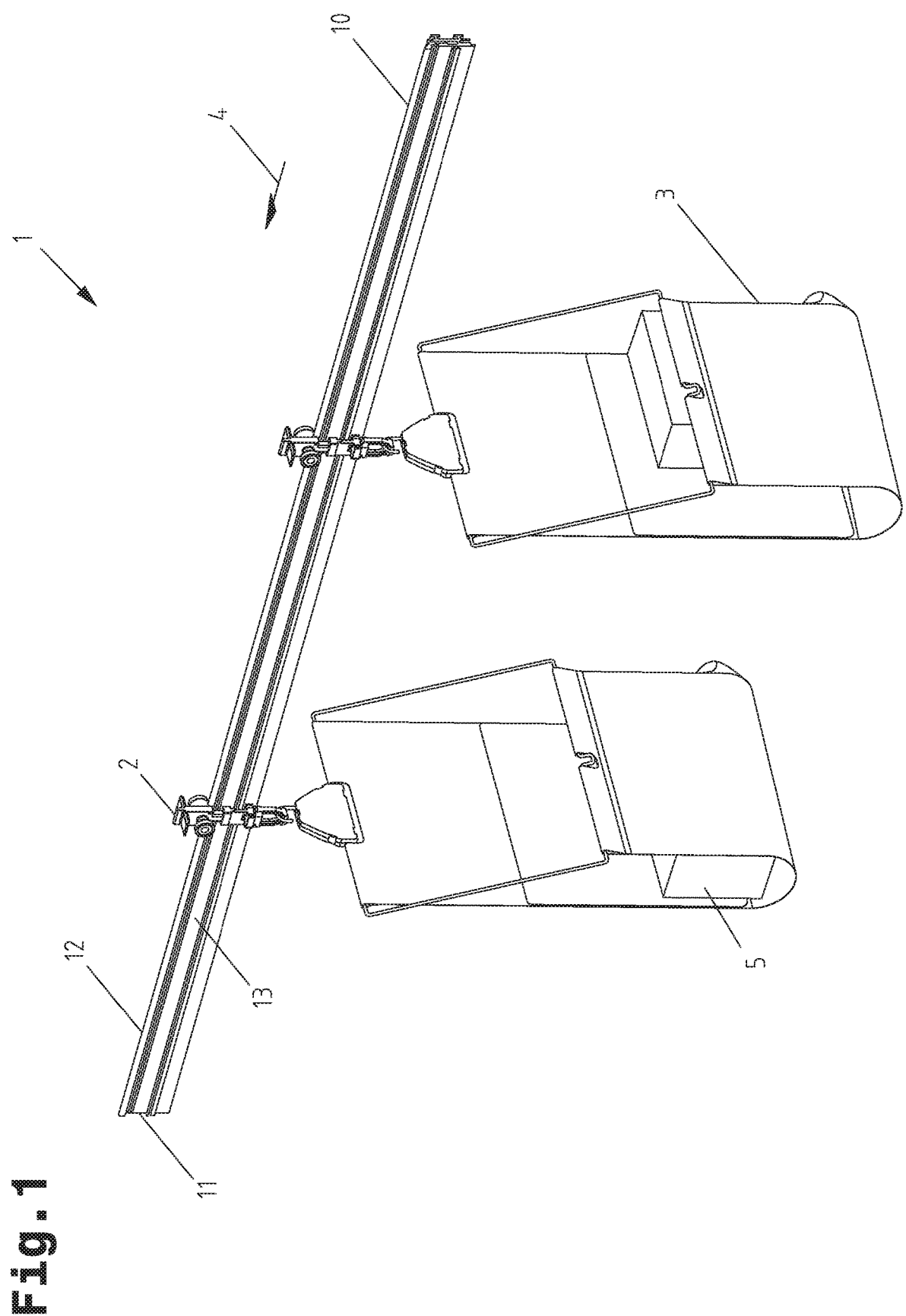
FIG. 1 an overhead conveying device for transporting hanging articles, in a perspective view.

FIG. 1 shows a section of an overhead conveyor device 1 with transport carriers 2 for transporting hanging articles 3 in a transport direction 4. Classic examples of hanging articles 3 are articles of clothing suspended on clothes hangers, or transport bags for receiving objects. FIG. 1 shows the hanging articles 3 as transport bags. The hanging article 3 is suspended on and below the transport carrier 2. A transport carrier 2 may also transport more than one hanging article 3. The transport bag can be loaded with an article 5. Preferably, a single article 5 is received in the transport bag. In general, more than one article 5 may also be received in the transport bag. The transport bag 2 can transport different articles 5, which vary in their geometry/dimension. The articles 5 are for example cardboard boxes, foil bags (so-called "polybags") or the like. Such foil bags are predominantly used in the textile industry and are for example used for packaging T-shirts, shirts and the like.

According to the embodiment shown in FIG. 1, the overhead conveying device 1 comprises in a transport section a guide device 10, a drive device 11, and the transport carriers 2 movable along the guide device 10 by the drive device 11. The guide device 10 is formed, for example, on a profile rail 12.

As shown in more detail in FIGS. 2a, 5a, 5b, 6a, 6b, the transport carriers 2 are moved by a friction drive (drive device 11) according to the exemplary embodiment shown. The transport carrier 2 comprises a base body 30 yet to be described further, which forms a drive section 31. The drive section 31 may cooperate with the guide device 10 and drive device 11 (in this transport section). The drive section 31 comprises in particular a (first) roller 32 rotatably mounted on an axle, and a friction surface 33, the latter of which can be brought into frictional contact with an endlessly revolving friction belt 13 of the drive device 11. The (second) roller 32 shown in the FIGS. is optional and serves for guiding the transport carrier 2 at a switching point.

The transport carrier 2 is arranged on the guide device 10 in a suspended manner via the (first) roller 32 and can be moved in the transport direction 4 by the friction drive.

According to an embodiment schematically shown in FIG. 2b, the transport carriers 2 can be moved by a positive engagement drive (drive device 11). The transport carrier 2 comprises a base body 30 yet to be described further, which forms a drive section 31. The drive section 31 may cooperate with the guide device 10 and drive device 11 (in this transport section). The drive section 31 comprises in particular a (first) roller 32 rotatably mounted on an axle, and an engagement surface 34, the latter of which can come into interlocking engagement with one of multiple driver elements 14 on an endlessly revolving friction belt 15 (drive belt, drive chain and the like). The (second) roller 32 shown in the FIGS. is optional and serves for guiding the transport carrier 2 at a switching point.

The transport carrier 2 is arranged on the guide device 10 in a suspended manner via the (first) roller 32 and can be moved in the transport direction 4 by the positive engagement drive. Such an embodiment is described for example in DE 10 2005 006 455 A1.

A combination of a friction drive and a positive engagement drive is also possible. Such an embodiment is described for example in EP 2 121 489 B1.

The described drive devices 12 are in no way to be understood restrictively, but only show different possibilities of how a driving force is transmitted from the drive device 11 to the drive section 31 of the transport carrier 2 (mounted so as to suspended on the guide device 10), in order to move it (so as to be driven) on the guide device 10 in the transport direction 4.

Figure 2C:
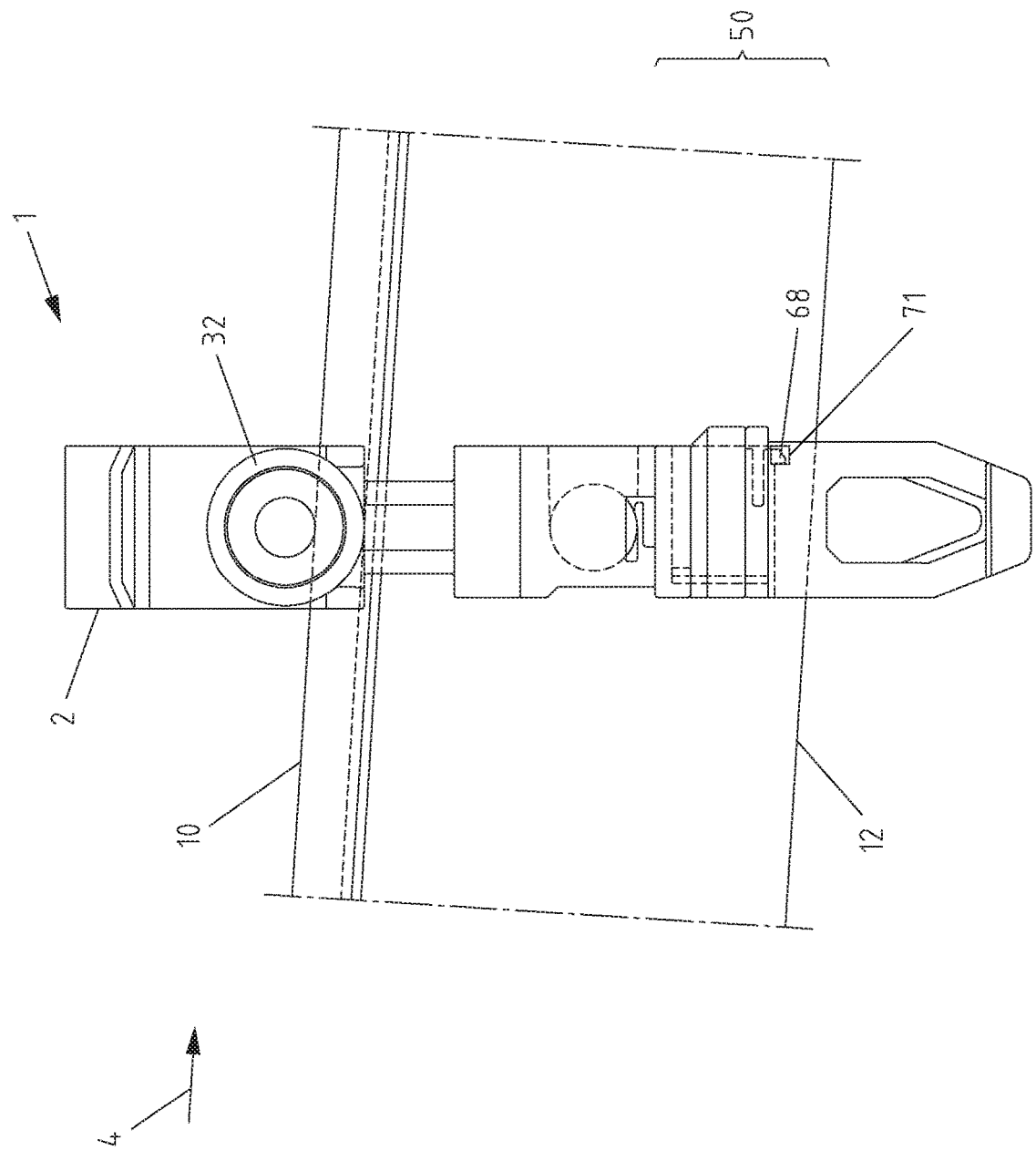
FIG. 2c an overhead conveying device with a guide device but without a drive device for the transport carriers, in a lateral view.

FIG. 2c shows the overhead conveying device 1 in a transport section, in which a drive device is not provided but only the guide device 10. The guide device 10 is formed, for example, on a profile rail 12 mounted in an inclined manner. In this case, the transport carriers 2 (mounted so as to be suspended on the guide device 10) are moved (not driven) on the guide device 10 in the transport direction 4 by gravity and without a drive device. The drive section 31 may cooperate only with the guide device 10 (in this transport section).

FIGS. 3a, 3b show a suspended transport bag (also referred to as "hanging bag") with a possible embodiment of a bag body. FIG. 3a shows the transport position and FIG. 3b shows an opened position, which relates to the loading position if the transport bag is to be loaded, or to the unloading position if the transport bag is to be unloaded. The article 5 is not depicted in these figures for the sake of clarity. Regarding the unloading station for automatic unloading of a transport bag and the different embodiments of a transport bag, the detailed disclosure in the Austrian patent application AT 520 517 A4 (A50320/2018) and A50059/2019 is made the subject matter of this disclosure.

The transport bag comprises a hanger 16, which can be hung in a receiving opening 54 for transporting the hanging article 3, which receiving opening 54 is provided on a supporting body 40a of the transport carrier 2 and is completely enclosed. The hanger 16 is preferably fastened to an (optional) suspended support 17 in a rigid manner.

The suspended support 17 and the transport carrier 2 are coupled to one another in an articulated manner by a hinged connection. The hinged connection is formed by the supporting body 40a with the receiving opening 54 and the hanger 16.

According to a possible embodiment, it proves advantageous if the transport bag is unloaded at an automatic unloading station, as it is described, for example, in the Austrian patent application AT 520 517 A4 (A50320/2018) and below. To that end, it may be provided in particular that the suspended support 17 and the transport carrier 2 are coupled to one another in an articulated manner by a hinged connection such that the suspended support 17 is pivotable relative to the transport carrier 2 about an axis 18 extending essentially in parallel to the guide device 10 (and/or essentially in parallel to the transport direction 4).

According to the embodiment shown, the transport bag comprises an (optional) frame 19 and a bag body, which is adjustable (optionally by the frame 19) between a transport position (FIG. 3a) and a loading or unloading position (FIG. 3b).

The (optional) frame 19 is mounted so as to be pivotable on and relative to the suspended support 17, about an axis 20 that is preferably oriented essentially horizontally.

The bag body comprises
- a front wall 21 and a rear wall 22,
- a first side edge 23a and a second side edge 23b along the front wall 21 and rear wall 22,
- a loading and/or unloading opening 24 formed on a first side of the bag body at least in some regions between the front and rear wall 21, 22,
- a side wall stop 25 formed on a second side of the bag body at least in some regions between the front and rear wall 21, 22, against which side wall stop 25 an article 5 can be placed, and
- a storage space for storing the article 59 between the front and rear wall 21, 22.

In a preferred embodiment, the front wall 21 and rear wall 22 are cut from a flexible (nonrigid) material, in particular cut from a continuous length of textile, length of film, a braid, a knitted fabric, a woven fabric or the like.

The front wall 21 comprises a first front wall section 26a, a second front wall section 26b and a base plate 27. The base plate 27 is provided in the first front wall section 26a. In particular, the first front wall section 26a comprises the base plate 27 and/or the first front wall section 26a forms the base plate 27. The base plate 27 is dimensionally stable and is preferably designed with a square shape. In general, it may also be rectangular.

The rear wall 22 comprises a first rear wall section 28a and a second rear wall section 28b. The first rear wall section 28a adjoins the first front wall section 26a, the latter being provided with the base plate 27. The rear wall 22 is formed with a lower rigidity and/or dimensional stability in the first rear wall section 28a than in the first front wall section 26a. In other words, the first front wall section 26a is designed to be more rigid and/or more dimensionally stable compared to the first rear wall section 28a.

As can be seen in FIG. 3a, the front wall 21 and rear wall 22 are approximated to one another in the transport position, and the article 5 (not shown) is held preferably clamped by the base plate 27 and the second rear wall section 28b. Additionally, the article 5 rests on the first rear wall section 28a. In its transport position, the bag body forms in the first rear wall section 28a a transport rest 29 extending between the first side edge 23a and second side edge 23b, which transport rest 29 comprises a transport rest surface slanting in the direction of the side wall stop 25 (thus extending inclined downwards). The transport rest surface adjoins the side wall stop 25.

As can be seen in FIG. 3b, the front wall 21 and rear wall 22 are moved away from each other, and the loading and/or unloading opening 24 is delimited by the front wall 21 and rear wall 22 and adjoins the first base plate 27 when the bag body is in one of the opened positions, which relates to the loading position if the transport bag is to be loaded, or to the unloading position if the transport bag is to be unloaded (loading and/or unloading position). In the loading and/or unloading position, the storage space is maximized in volume. According to a preferred embodiment, both loading and unloading of the transport bag is executed via the loading and unloading opening 24. In principle, loading can also be executed from above, through the frame 19. However, unloading is executed via the unloading opening 24 according to this embodiment, as well. Loading and/or unloading can be executed automatically or manually.

As can be seen in FIGS. 3a, 3b, the front wall 21 is mounted, with the second front wall section 26b, on a front cross strut of the frame 19 in an articulated manner (first pivot bearing), and the rear wall 22 is mounted, with the second rear wall section 28b, on a rear cross strut of the frame 19 in an articulated manner (second pivot bearing).

FIGS. 2a, 2b, 4, 5a, 5b, 6a, 6b (supporting body in a first configuration with a completely enclosed receiving opening) and FIGS. 7a, 7b (in a second configuration with a suspension hook) show different views of a transport carrier 2 for an overhead conveying device, preferably for the overhead conveying device 1 described above, which comprises a base body 30 and a supporting body 40a, 40b exchangeably mounted by a connecting device 50 for transporting a hanging article 3. FIGS. 2a, 2b, 2c show the supporting body 40a in the operation position mounted on the base body 30, and FIGS. 5a, 5b, 6a, 6b show the supporting body 40a in the preparation position detached from the base body 30. The transport carrier 2 forms a longitudinal axis 51, which is, in particular, oriented vertically when the transport carrier 2 is arranged in a suspended manner on the guide device 10.

The base body 30 is equipped with a drive section 31, which may cooperate with a guide device 10 and/or with a drive device 11 of the overhead conveying device 1, and a supporting body connecting section 52. The supporting body 40a comprises a base body connecting section 53 and, in a first configuration, a completely enclosed receiving opening 54. The supporting body 40b comprises a base body connecting section 53 and, in a second configuration, a suspension hook 55.

The connecting device 50 comprises a profile groove 60 (first positive engagement element) extending perpendicular to the longitudinal axis 51 in one of the base and supporting body connecting sections 52, 53, and a profile projection 61 (second positive engagement element) extending perpendicular to the longitudinal axis 51 in one of the base and supporting body connecting sections 52, 53.

According to a preferred embodiment, the profile groove 60 (first positive engagement element) is arranged on the base body 30 in the supporting body connecting section 52, and the profile projection 61 (second positive engagement element) is arranged on the supporting body connecting section 40a, 40b in the base body 53.

The profile groove 60 comprises an undercut 62, which forms an insertion opening 63 on the end side in the direction of its longitudinal extension. The profile projection 61 comprises a profile web 64 and a profile head 65 formed on the profile web 64 so as to expand the cross section. The profile projection 61 can be inserted into the profile groove 60 via the insertion opening 63 in an insertion direction 66 (FIG. 4) oriented perpendicular to the longitudinal axis 51.

In a preferred embodiment, the undercut profile groove 60 and the profile projection 61 are designed having an essentially T-shaped cross-section.

As depicted exclusively in FIG. 5b, the transport carrier 2 comprises a front wall 56 and a rear wall 57. The undercut profile groove 60 is formed by a profile groove extending from the front wall 56 in the direction of the rear wall 57. The profile groove ends in front of the rear wall 57, so that a material web 67 remains.

The undercut profile groove 60 can additionally be formed by a profile groove continuously opened toward the supporting body 40a, 40b and along its longitudinal extension.

According to a preferred embodiment, the connecting device 50 comprises mutually engageable locking elements 68, 71, which are arranged and configured such that the base body 30 and supporting body 40a, 40b are locked so as to be mutually prevented from being displaced in the longitudinal direction of the profile groove 60, if the exchangeable supporting body 40a, 40b is mounted on the base body 30, as can be seen in FIG. 2c exclusively.

The locking elements comprise first locking elements 68 configured as elastically resilient spring arms, each having a locking lug 70 formed on a spring clip 69, in one of the base and supporting body connection sections 52, 53 on both sides of the profile groove 60. The locking elements comprise second locking elements 71 configured as locking openings 72 arranged in one of the base and supporting body connection sections 52, 53 on both sides of the profile web 64.

According to a preferred embodiment, the first locking elements 68 (spring arms with locking lugs 70) are arranged on the base body 30 in the supporting body connecting section 52, and the second locking elements (locking openings 72) are arranged on the supporting body 40a, 40b in the base body connecting section 53.

According to a preferred embodiment, the connecting device 50 comprises receiving slots 80 arranged in one of the base body and supporting body connecting sections 52, 53 on both sides of the profile web 64, each of which forms support surfaces 81 extending in the insertion direction 66 of the supporting body 40a, 40b and a locking opening 72 arranged in a rear end region in the insertion direction 66 of the supporting body 40a, 40b.

If the supporting body 40a, 40b is moved relative to the base body 30 in the insertion direction 66 perpendicular to the longitudinal axis 51, the spring arms are, for example, bent inwards by the locking lugs 70 resting on the support surfaces 81 (in a sliding manner), and relax outwards, as soon as the locking lugs 70 have passed the edging of the locking openings 72. For example, sawtooth-like locking lugs 70 engage behind the edging of the locking openings 72.

The positive connection can be released by the spring arms being deflected in a bending direction extending perpendicular to their main direction of extension such that the locking lugs 70 are brought out of engagement with the edging of the locking openings 72. Simultaneously, the supporting body 40a, 40b is moved towards the longitudinal axis 51 against the insertion direction 66 in a perpendicular direction.

For this purpose, the connecting device may have access channels 82, which the locking openings 72 lead into. Preferably, a tool may be introduced into the access channels 82, and with that, the locking lugs 70 may be levered out of the locking openings 72.

As depicted, for example, in FIGS. 6a, 6b, 7a, 7b, the base body 30 may comprise a receiving chamber 85 extending perpendicular to the longitudinal axis 51 and having an opening slot 86 formed on the end side in the direction of its longitudinal extension, and an identifying means 87, which can be inserted into the receiving chamber 85 via the opening slot 86. The identifying means 87 is preferably designed as an RFID transponder.

In particular, the receiving chamber 85 comprises a base opened toward the supporting body connecting section 52 and an elastically resilient spring arm 88 which has a rest surface, and which protrudes in the direction toward the base. The RFID transponder which is inserted into the receiving chamber 85 is supported on the rest surface and is held by the spring arm 88.

The receiving chamber 85 and the identifying means 87 are arranged in a transport carrier identifying section 89 between the drive section 31 and the supporting body connecting section 52.

Figure 4:
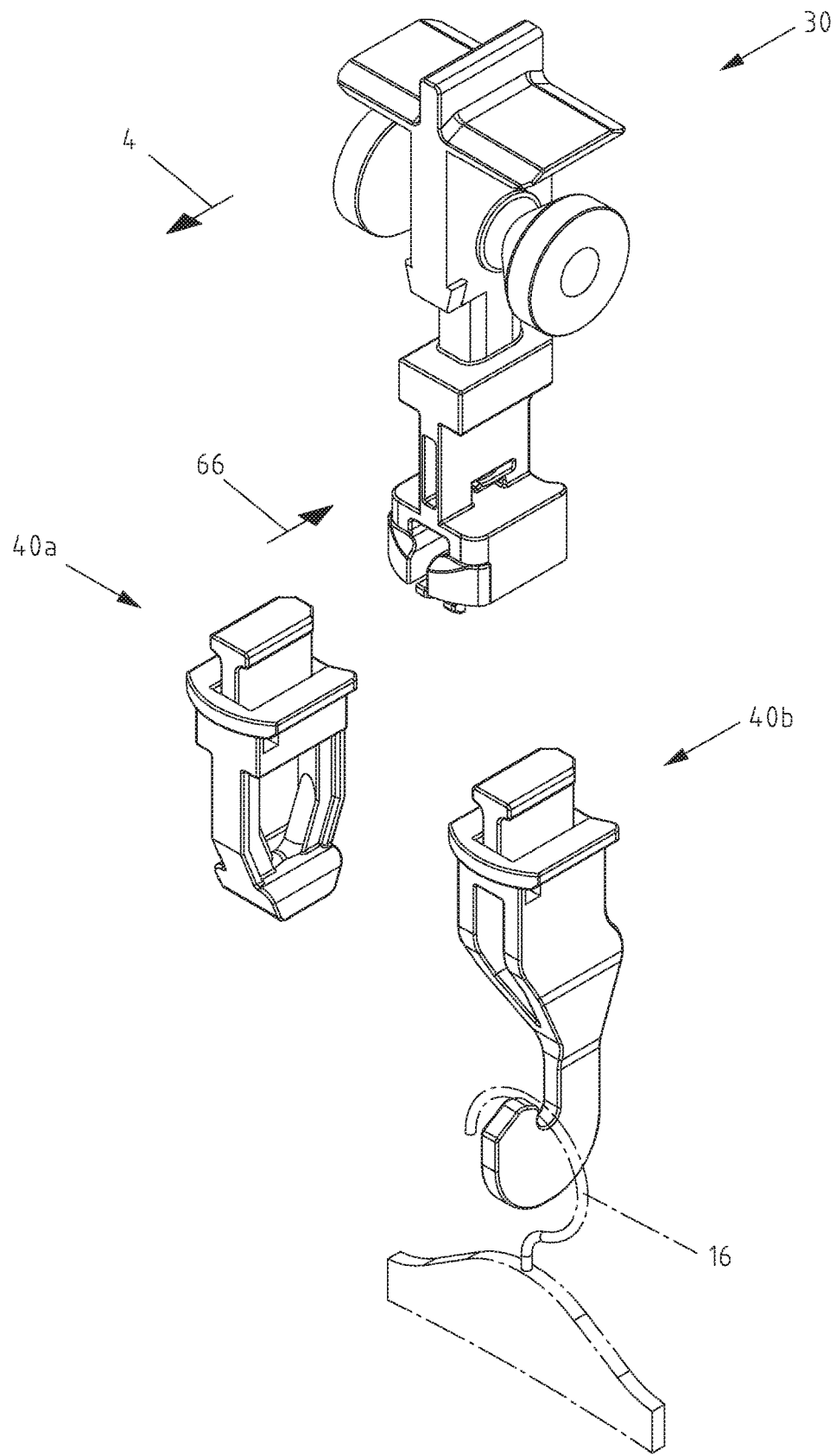
FIG. 4 a transport carrier system for an overhead conveying device with a universally applicable base body and supporting bodies exchangeable by a connecting device, in a first configuration with a completely enclosed receiving opening for transporting a transport bag (shown in FIGS. 3a, 3b), and in a second configuration with a suspension hook for transporting a clothes hanger (only partially shown), in a perspective view.

FIG. 4 shows a transport carrier system for an overhead conveying device, preferably for the overhead conveying device 1 described above.

The transport carrier system comprises
- a first supporting body 40a in a first configuration with a base body connecting section 53 and a completely enclosed receiving opening 54 for transporting a hanging article 3,
- a second supporting body 40b in a second configuration with a base body connecting section 53 and a suspension hook 55 for transporting a hanging article 3, and
- a universally applicable base body 31 with a drive section 31, which may cooperate with a guide device 10 and/or with a drive device 11 of the overhead conveying device 1, and a supporting body connecting section 52.

The first supporting body 40a or the second supporting body 40b in the second configuration may be mounted to the base body 30 so as to be exchangeable by the connecting device 50 described above, in order to optionally form a transport carrier 2 in a first configuration with a completely enclosed receiving opening 54 for transporting a hanging article 3 or a transport carrier 2 in a second configuration with a suspension hook 55 for transporting a hanging article 3. The transport carrier 2 in the first configuration preferably serves for transport in a transport bag, wherein its hanger 16 is hung into the receiving opening 54 (see for example FIG. 3a). The transport carrier 2 in the second configuration preferably serves for transporting an article of clothing on a clothes hanger, wherein the hanger 16 of the clothes hanger is hung on the suspension hook 55 (see FIG. 4, shown in dot-dashed lines in some sections).

Irrespective of the configuration which the supporting bodies 40a, 40b have, these are always provided with the structurally equal and/or identical base body connecting section 53.

FIGS. 5a, 5b show the first supporting body 40a in further detail. In a simplified design, it comprises
- a front side wall 42 running essentially in parallel to the longitudinal axis 51,
- a lower side wall 90 extending between the front side wall 42 and rear side wall 43, and
- an upper side wall 91 extending between the front side wall 42 and rear side wall 43.

The receiving opening 54 for a hanger 16 of the hanging articles 3 is completely enclosed by the side walls 42, 43, 90, 91. The front side wall 42 and the rear side wall 43 each comprise a lower wall section 92 and an upper wall section 93. The lower wall sections 92 are provided with guide edges 94 tapering towards each other in the direction towards the lower side wall 90 and end in the lower side wall 90. The first supporting body 40a may optionally have a first rest section 95 and a second rest section 96 on the lower side wall 90, as will be described below.

In FIGS. 4a, 4b, 4c, 4d, 4e, 4f described below, a supporting body 40b for a transport carrier 2' with different designs of a transport lock 190, 190', 190" is described. FIGS. 4g to 4j show an overhead conveying device 1 having a guide device 10 and a drive device 11 for frictional drive of the transport carriers 2'. As described above, alternatively, the drive device may be formed for positive engagement drive of the transport carriers 2'. However, it is also possible that the overhead conveying device 1 comprises a guide device 10, however, does not comprise a drive device 11.

Figure 4B:
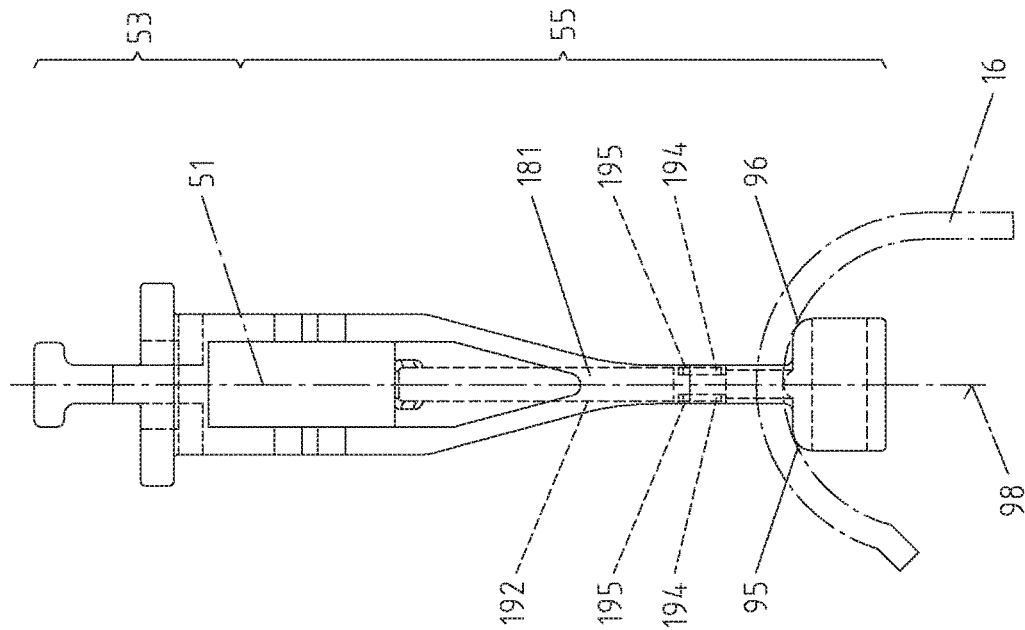
FIGS. 4a, 4b a supporting body with a first embodiment of a transport lock in different views.
Figure 4A:
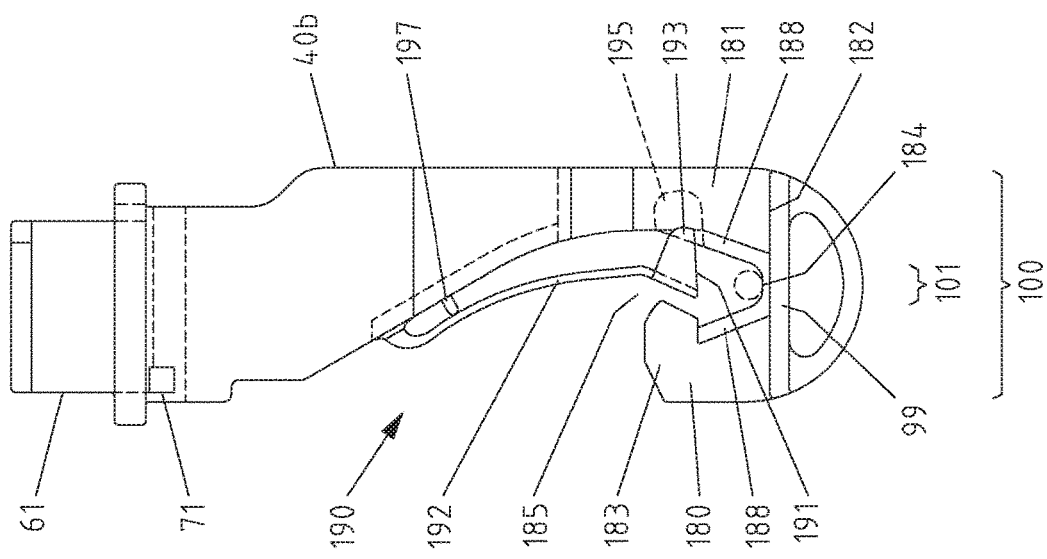
Figure 4D:
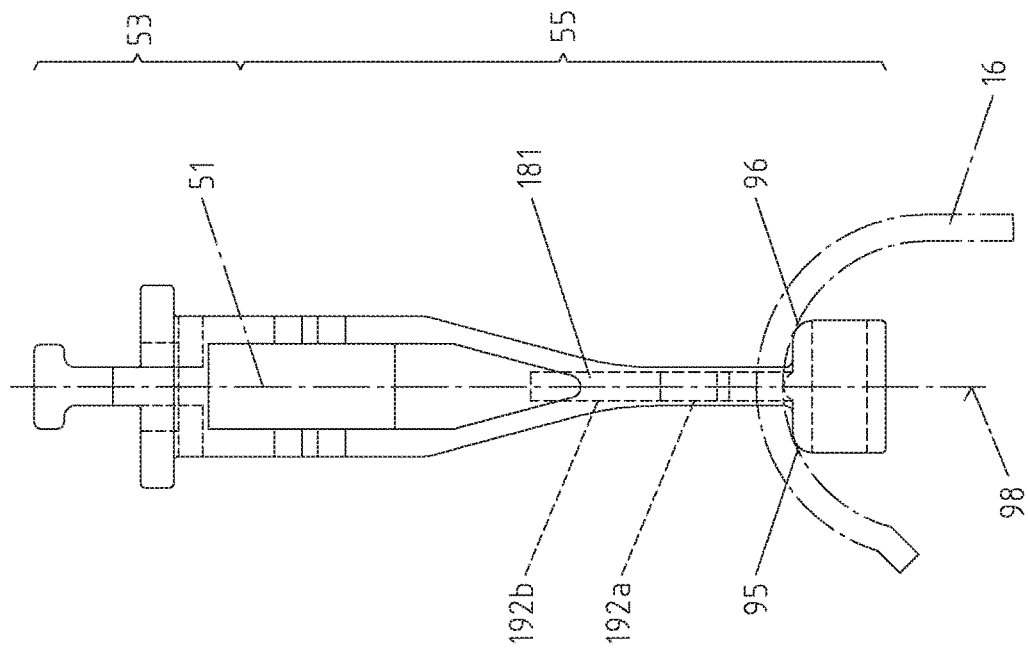
FIGS. 4c, 4d a supporting body with a second embodiment of a transport lock in different views.
Figure 4C:
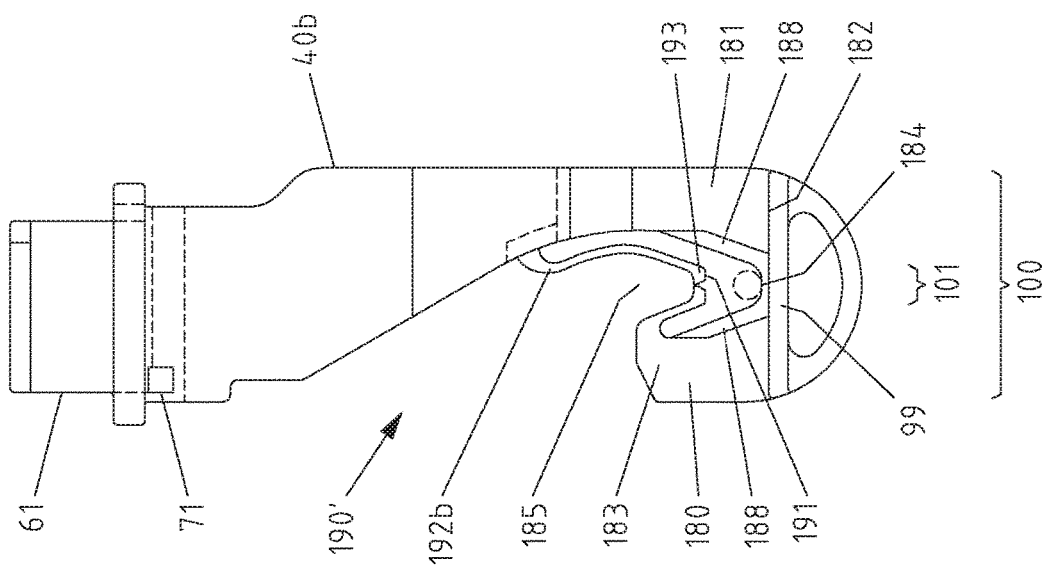
Figure 4G:
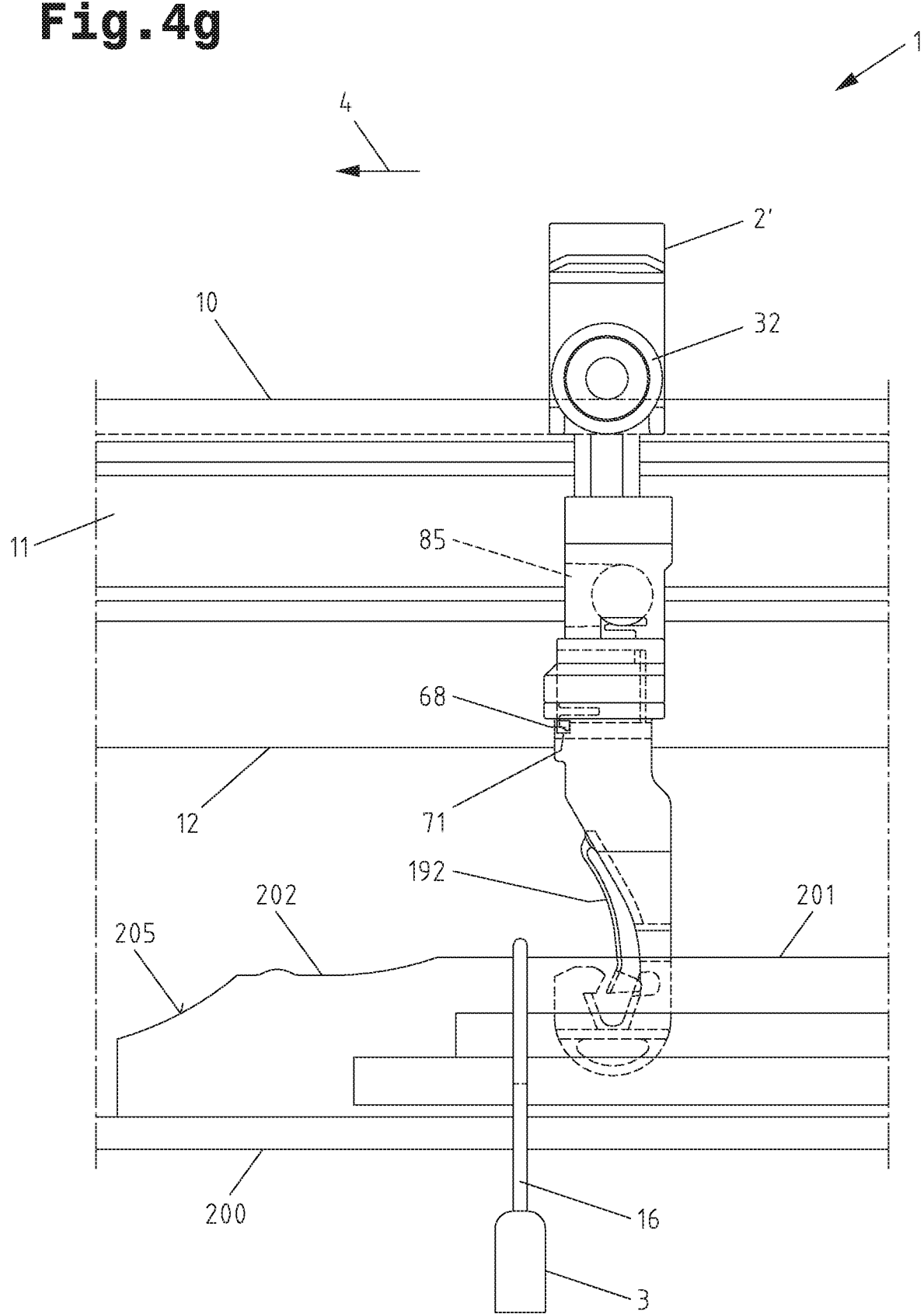
FIGS. 4g to 4i an overhead conveying device with a guide device, a transport carrier with a supporting body according to the embodiment in FIGS. 4a, 4b, and a loading station, with a process sequence for loading the transport carrier with a hanger of a hanging article, in a lateral view.
Figure 4H:
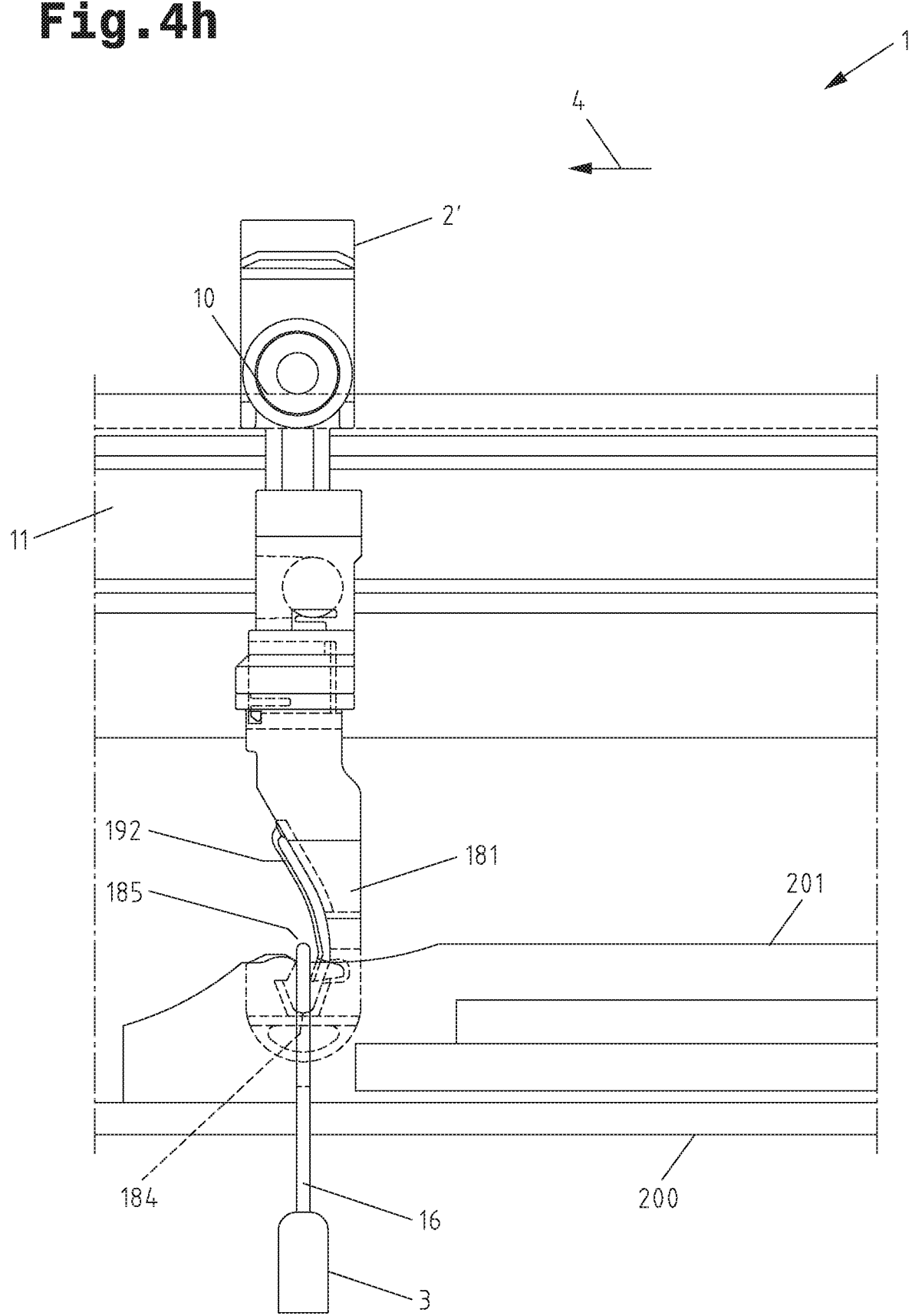
Figure 4I:
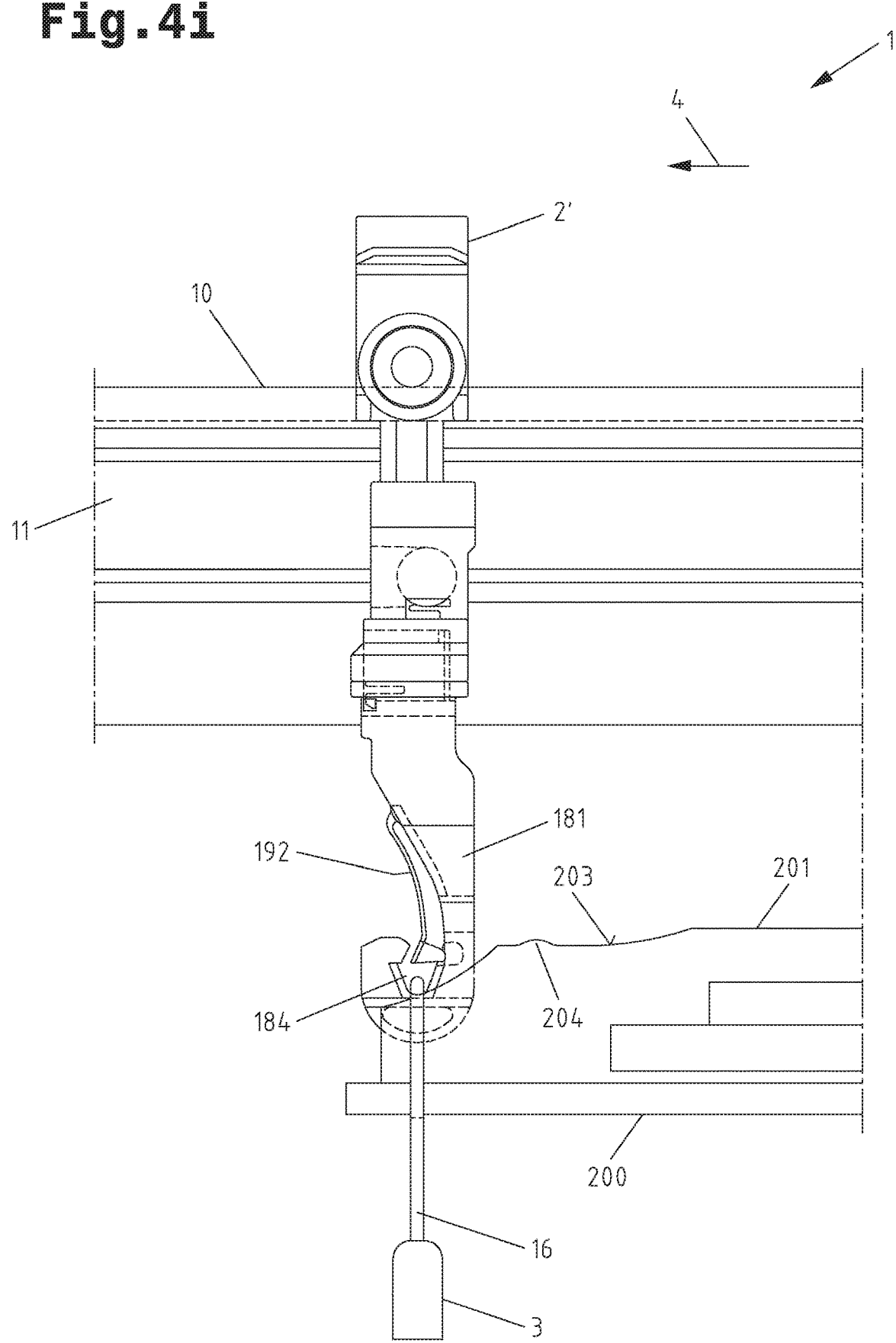
Figure 4J:
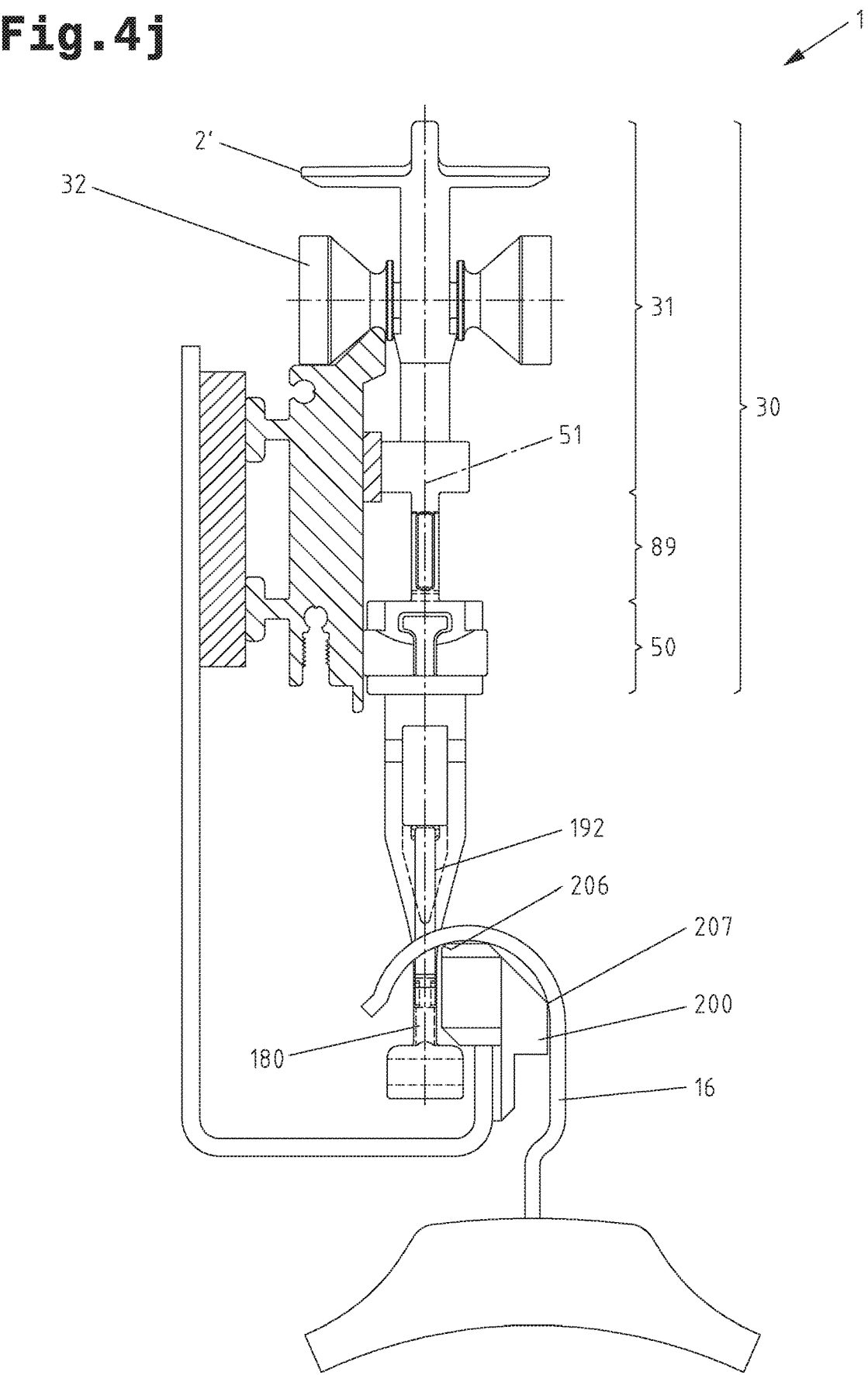
FIG. 4j the overhead conveying device according to FIG. 4g, in a front view and partially in a sectional view.
Figure 6A:
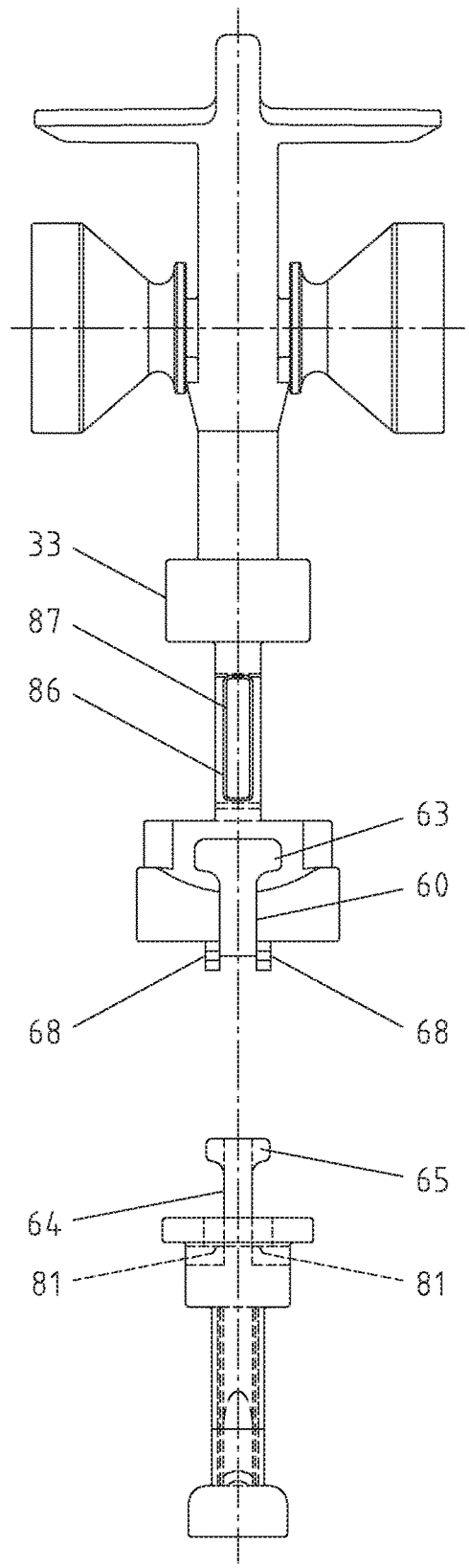
FIG. 6a the transport carrier according to FIG. 5a, in a first front view.
Figure 6B:
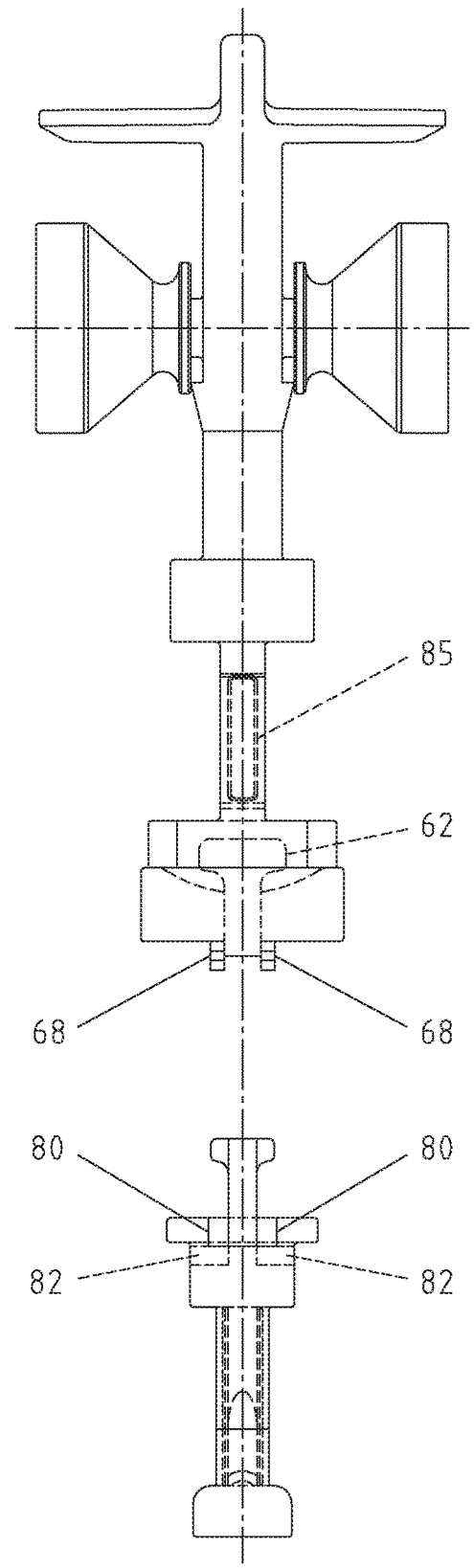
FIG. 6b the transport carrier according to FIG. 5a, in a second front view.

At this point, it should be noted that in FIGS. 4a, 4j, the embodiment is shown according to which the transport carrier 2' comprises the base body 30 described above and the supporting body 40b exchangeably mounted by a connecting device 50 for transporting a hanging article 3.

As opposed to this, the base body 30 and the supporting body 40b may also be connected to one another permanently. Thus, the connecting device 50 is omitted, which is, however, not shown in these figures.

According to this embodiment, the transport carrier 2' for transporting a hanging article 3 on the overhead conveying device 1 comprises the vertical longitudinal axis 51, which is, in particular, oriented vertically when the transport carrier 2' is arranged in a suspended manner on the guide device 10, the base body 30 with the drive section 31, which can cooperate with the guide device 10 and/or a drive device 11 of the overhead conveying device 1, and the supporting body 40b having
 a front side wall 180 running essentially in parallel to the longitudinal axis 51,
 a rear side wall 181 running essentially in parallel to the longitudinal axis 51,
 a lower side wall 182 extending between the front side wall 180 and the rear side wall 181,
 an upper side wall 183 extending between the front side wall 180 and the rear side wall 181,
 a receiving section 184 for the hanger 16 of the hanging article 3, formed by the front side wall 180, the rear side wall 181 and the lower side wall 182, and
 an access channel 185 leading into the receiving section 184 and allowing the hanger 16 of the hanging article 3 to be inserted into the receiving section 184.

The front side wall 180 and the rear side wall 181 each comprise a lower wall section. The lower wall sections are provided with guide edges 188 tapering towards each other in the direction towards the lower side wall 182 and end in the lower side wall 182.

According to an advantageous first embodiment, the lower side wall 182 comprises the first rest section 95 and the second rest section 96, which are arranged on both sides of the midplane 98 spanned between the front side wall 180 and the rear side wall 181 and each offset at a distance from the midplane 98, such that the hanger 16 is positioned between the guide edges 188 and can be supported on the first rest section 95 and the second rest section 96.

According to an advantageous second embodiment, the supporting body 40b additionally comprises a transport lock 190, which is arranged above the receiving section 184 with a vertical distance, and forms a stop surface 191, which stop surface 191 limits or impedes a relative shift of the hanger 16 in the direction toward the transport lock 190.

According to the second embodiment (which may form the subject matter of an independent application), the transport carrier 2', for transporting a hanging article 3 on the overhead conveying device 1, comprises the vertical longitudinal axis 51 (which is, in particular, oriented vertically when the transport carrier 2' is arranged in a suspended manner on the guide device 10), the base body 30 with the drive section 31, which can cooperate with the guide device 10 and/or a drive device 11 of the overhead conveying device 1, and the supporting body 40b having
 a front side wall 180 running essentially in parallel to the longitudinal axis 51,
 a rear side wall 181 running essentially in parallel to the longitudinal axis 51,
 a lower side wall 182 extending between the front side wall 180 and the rear side wall 181,
 an upper side wall 183 extending between the front side wall 180 and the rear side wall 181,
 a receiving section 184 for the hanger 16 of the hanging article 3, formed by the front side wall 180, the rear side wall 181 and the lower side wall 182,
 an access channel 185 leading into the receiving section 184 and allowing the hanger 16 of the hanging article 3 to be inserted into the receiving section 184, and
 a transport lock 190 arranged above the receiving section 184 with a vertical distance and forming a stop surface 191, the stop surface 191 limiting or impeding a relative shift of the hanger 16 in the direction toward the transport lock 190.

Accordingly, the transport carrier 2' may also form a lower side wall 182 which comprises no additional first rest section 95 and second rest section 96.

An advantageous third embodiment results from the combination of the first embodiment and the second embodiment.

According to the third embodiment (which may form the subject matter of an independent application), the transport carrier 2', for transporting a hanging article 3 on the overhead conveying device 1, comprises the vertical longitudinal axis 51 (which is, in particular, oriented vertically when the transport carrier 2' is arranged in a suspended manner on the guide device 10), the base body 30 with the drive section 31, which can cooperate with the guide device 10 and/or a drive device 11 of the overhead conveying device 1, and the supporting body 40b having
 a front side wall 180 running essentially in parallel to the longitudinal axis 51,
 a rear side wall 181 running essentially in parallel to the longitudinal axis 51,
 a lower side wall 182 extending between the front side wall 180 and the rear side wall 181,
 an upper side wall 183 extending between the front side wall 180 and the rear side wall 181,
 a receiving section 184 for the hanger 16 of the hanging article 3, formed by the front side wall 180, the rear side wall 181 and the lower side wall 182,
 an access channel 185 leading into the receiving section 184 and allowing the hanger 16 of the hanging article 3 to be inserted into the receiving section 184, and
 a transport lock 190 arranged above the receiving section 184 with a vertical distance and forming a stop surface 191, the stop surface 191 limiting or impeding a relative shift of the hanger 16 in the direction toward the transport lock 190,
 wherein the lower side wall 182 comprises the first rest section 95 and the second rest section 96, which are arranged on both sides of the midplane 98 spanned between the front side wall 180 and the rear side wall 181 and each offset at a distance from the midplane 98, such that the hanger 16 is positioned between the guide edges 188 and can be supported on the first rest section 95 and the second rest section 96.

As already described in detail above and as is to be applied likewise to the embodiments described in FIGS. 4a, 4b, 4c, 4d, 4e, 4f, the guide edges 188 enclose an opening angle (a) of less than 90°. It is also advantageous if the guide edges 188 each form a rounded guide surface. According to a possible embodiment, the first rest section 95 and the second rest section 96 comprise edges 99 extending in parallel to each other, the minimum length 100 of which is greater than a minimum opening width 101 between the guide edges 188. The edges 99 may each form a rounded rest surface.

FIGS. 4a and 4b show a first embodiment of the transport lock 193 which comprises an elastically resilient spring arm arranged on the rear side wall 181, which spring arm has a spring clip 192 and a stop 193 arranged on the protruding end, wherein the stop 193 protrudes into the access channel 185 and forms the stop surface 191 on its side wall facing the receiving section 184. In FIG. 4a, the spring clip 192 is in a (non deflected) locked position, where the stop surface 191 limits a relative shift of the hanger 16 in the direction toward the transport lock 190. Moreover, in the locked position of the spring clip 192, the access channel 185 is narrowed in cross-section by the stop 193 to such an extent that a schematically depicted hanger 16 cannot enter the access channel 185.

Although this is not shown in FIGS. 4a, 4b, 4g and 4i, it is generally also possible that the spring clip 192 may rest with its projecting end against the front side wall 180 and/or upper side wall 183 when the spring clip 192 is in the locked position.

In the (deflected) release position of the spring clip 192, the access channel 185 is widened in cross-section to such an extent that a schematically depicted hanger 16 can be fed onto the receiving section 184 via the access channel 185, as can be seen in FIG. 4h.

It may also prove advantageous for the spring clip 192 to be supported on a bearing point 197 in the rear end region. The bearing point 197 may be formed on the spring clip 192, such that the bearing point 197 rests against/may rest against the rear side wall 181, in particular when the spring clip 192 is in a (non deflected) locked position. Alternatively, the bearing point 197 may be formed on the rear side wall 192, such that the bearing point 197 rests against/may rest against the spring clip 192, in particular when the spring clip 192 is in a (non deflected) locked position. It may also be provided that the supporting body 42b is equipped with non depicted additional weight which is arranged on the rear side wall 181. The additional weight may also form said bearing point 197. It should be noted that for the sake of clarity the bearing point 197 is depicted schematically and merely in FIG. 4a.

As can be seen in FIGS. 4a and 4b, the rear side wall 181 and the spring clip 192 comprise guide elements 194, 195 which can be brought into engagement with one another.

Specifically, the spring clip 192 may be provided with a first guide element 194 and a second guide element 194. Preferably, the first guide element 194 and second guide element 194 project from the spring clip 192 in the direction toward the rear side wall 181. The first guide element and the second guide element are preferably arranged on both sides of the spring clip 192 and transversely opposite to a longitudinal axis of the spring clip 192, as can be seen in FIG. 4b. However, the first guide element 194 and second guide element 194 may also be arranged on both sides on the spring clip 192 and offset from each other in the direction toward a longitudinal axis of the spring clip 192. According to a possible embodiment, the first guide element 194 and second guide element 194 may be arranged in the front end region of the spring clip 192, and extend at maximum over a third of the length of the spring clip 192. Specifically, the first guide element 194 and second guide element 194 form guide projections.

According to the embodiment shown, the rear side wall 181 is provided with a first guide element 195 and a second guide element 195. The first guide element 194 of the spring clip 192 and the first guide element 195 of the rear side wall 181 are designed to be complementary. Likewise, the second guide element 194 of the spring clip 192 and the second guide element 195 of the rear side wall 181 are designed to be complementary. If the first/second guide element 194 of the spring clip 192 are formed by guide projections, the first/second guide element 195 of the rear side wall 181 is formed by guide recesses.

FIGS. 4c and 4d show a second embodiment of the transport lock 190', which has an elastically resilient first spring arm arranged on the front side wall 180, which first spring arm has a spring clip 192a and a stop 193 arranged on the protruding end, and an elastically resilient second spring arm arranged on the rear side wall 181, which second spring arm has a spring clip 192b and a stop 193 arranged on the protruding end, wherein the stops 193 each protrude into the access channel 185 and form the stop surfaces 191 on a side wall facing the receiving section 184. In FIG. 4c, the spring clips 192a, 192b are each in a (non deflected) locked position, where the stop surfaces 191 may delimit a relative shift of the hanger 16 in the direction toward the transport lock 190. In the locked position of the spring clips 192a, 192b, the access channel 185 is narrowed in cross-section by the stops 193 to such an extent that a schematically depicted hanger 16 cannot enter the access channel 185. As not shown in further detail, the spring clips 192a, 192b can each be moved in a (deflected) release position, wherein, in the release positions of the spring clips 192a, 192b, the access channel 185 is widened in cross-section to such an extent that a schematically depicted hanger 16 can be fed onto the receiving section 184 via the access channel 185.

FIGS. 4e and 4f show a third embodiment of the transport lock 190", which comprises a raised area 196 arranged on the rear side wall 181, which raised area 196 protrudes into the access channel 185 and forms the stop surface 191. The raised area 196 is designed to be essentially rigid and forms an "interfering contour" in the access channel 185, impeding a relative shift of the hanger 16 in the direction toward the transport lock 190. Thereby, a "rising" of the hanger 16 on a guide edge 188 can be permitted to a limited extent on the one hand, and on the other hand, a "de-threading" of the hanger 16 out of the receiving section 184 via the access channel 185 can be hindered. The guide edge 188 and the raised area 196 run into each other (adjoin each other) and enclose an angle, in particular an angle smaller than 150°. Thereby, a hanger 16 "rising" on a guide edge 188 is reverted in the direction of movement at the stop surface 191.

FIGS. 4g to 4h show a possible embodiment of an overhead conveying device 1 with one of the transport carriers 2' for transporting a hanging article 3, and the guide device 10, along which the transport carrier 2' can be moved, and/or the drive device 11, which transfers a driving force onto the transport carrier 2'.

Additionally, the overhead conveying device 1 may comprise a loading station for automatic loading of the transport carriers 2' with hanging articles 3, which hang on hangers 16.

The loading station for automatic loading of the transport carriers 2' comprises a loading rail 200 arranged below the guide device 10 and extending in parallel to the guide device 10, on which loading rail 200 the hanging articles 3 are fed and on which they are provided.

The loading rail 200 comprises a provisioning section located upstream, in which the hanging articles 3 can be provided on hangers 16, and a transfer section located downstream, in which the hanging articles 3 can be transferred from the loading rail 200 to the transport carrier 2'. The provisioning section forms a guide rest 201, and the transfer section forms a track rest 202.

With respect to the guide rest 201, the track rest 202 may form a first guideway 203 sloping downwards in the transport direction 4, and in the longitudinal course, an overrun raised area 204 protruding on the first guideway 203.

The transport carrier 2' moves the hanger 16 out of the provisioning section shown in FIG. 4g in the transport direction 4 into the transfer section and along the transfer section. In this process, the hanger 16 glides along the guide rest 201 and the track rest 202. Along the track rest 202, the hanger 16 follows the longitudinal course of the guideway 203, so that the hanger 16 is not only moved (in particular continuously) in the transport direction 4 but also in the direction toward the receiving section 184 via the guide channel 185.

If the overrun raised area 204 is run over by the hanger 16 in the transport direction 4, as shown in FIG. 4h, the spring clip 192 is pushed so far in the direction of the rear side wall 181 that the hanger 16 can be moved via the widened guide channel 185 in the direction toward the receiving section 184. By the weight force alone, the hanger 16 pushes (displaces) the spring clip 192 out of the locked position (FIG. 4g) in the direction toward the rear side wall 181 into the release position (FIG. 4h).

In FIG. 4i, it can be seen that the track rest 202 forms a second guideway 205 downstream of the overrun raised area 204, sloping downwards in the transport direction 4, in order to guide the hanger 16 by the track rest 202 after insertion into the access channel 185. This allows a particularly reliable and gentle transfer of the hanger 16 to the transport carrier 2' although this is in no way to be understood as being mandatory.

As can be seen in FIG. 4i, the hanger 16 is located in the/on the receiving section 184 and below the transport lock 190, so that the hanger 16 releases the spring clip 192, which is then moved back automatically out of the release position into the locked position.

The automatic loading of the transport carrier 2' can be executed continuously (without standstill).

FIG. 4j shows the overhead conveying device 1 in a front view and partially in a sectional view. The loading rail 200 can be seen, which has a first rest section 206 and a second rest section 207 extending parallel in the transport direction 4, so that the hanger 16 is at least partially guided along the provisioning section and at least partially along the transfer section in the transport movement.

At this point, it should be noted that a transport carrier 97 is to be read synonymously in the embodiments in FIGS. 4a to 4j, when the base body 30 and the supporting body 40b are permanently connected to each other.

FIGS. 8a, 8b, 8c show a possible embodiment of a transport carrier 97 for transporting a hanging article 3 on an overhead conveying device, preferably for the overhead conveying device 1 described above.

The transport carrier 97 comprises the vertical longitudinal axis 51, the base body 30 with the drive section 31, which may cooperate with the guide device 10 and/or with the drive device 11 of the overhead conveying device 1, and the supporting body 40a, 40b.

In contrast to the embodiment described above, however, the base body 30 and supporting body 40a are permanently connected to one another. Thus, the connecting device 50 is omitted.

The base body 30 is constructed as described above and is not described again at this point.

The supporting body 40a is constructed as described above, and it comprises a first rest section 95 and a second rest section 96 on the lower side wall 90. The first rest section 95 and second rest section 96 are arranged on both sides of a midplane 98 spanned between the front side wall 42 and rear side wall 43 and each offset at a distance from the midplane 98. Thereby, the hanger 16 can be positioned between the guide edges 94 and supported on the first rest section 95 and second rest section 96 for transporting the hanging articles 3 on the transport carrier 97. If an unloading station for automatically unloading the transport bag is provided, as it is described in the Austrian patent application AT 520 517 A4 (A50320/2018) and A50059/2019 as well as below, the hanger 16 may be positioned between the guide edges 94 and supported on one of the first/second rest sections 95, 96 during the unloading operation of the transport bag.

The first rest section 95 and the second rest section 96 comprise edges 99 extending in parallel to each other, the minimum length 100 of which is greater than a minimum opening width 101 between the guide edges 94. The (longitudinal) edges 99 each form a rounded rest surface.

As depicted in FIG. 8b, the guide edges 94 enclose between them an opening angle "α" of less than 90°. An opening angle "α" of about 30° is particularly preferred. The guide edges 94 each form a rounded guide surface.

At this point, it should be noted that the transport carrier 97 may optionally comprise the connecting device 50 between the base body 30 and the supporting body 40a, 40b, as described above.

In other words, the transport carrier according to FIGS. 8a, 8b, 8c may be designed to be formed of multiple parts and comprising an exchangeable transport body 40a, 40b, or the transport carrier is designed as one part and the base body 30/transport body 40a are permanently connected.

It is also possible that, in turn, the receiving chamber 85 and the identifying means 87 are provided, as described above, wherein the transport carrier identifying section is then located in the drive section 31, as it is not shown in further detail.

The overhead conveyor system may additionally comprise an unloading station 104 for automatic unloading of the transport bag.

Figure 9:
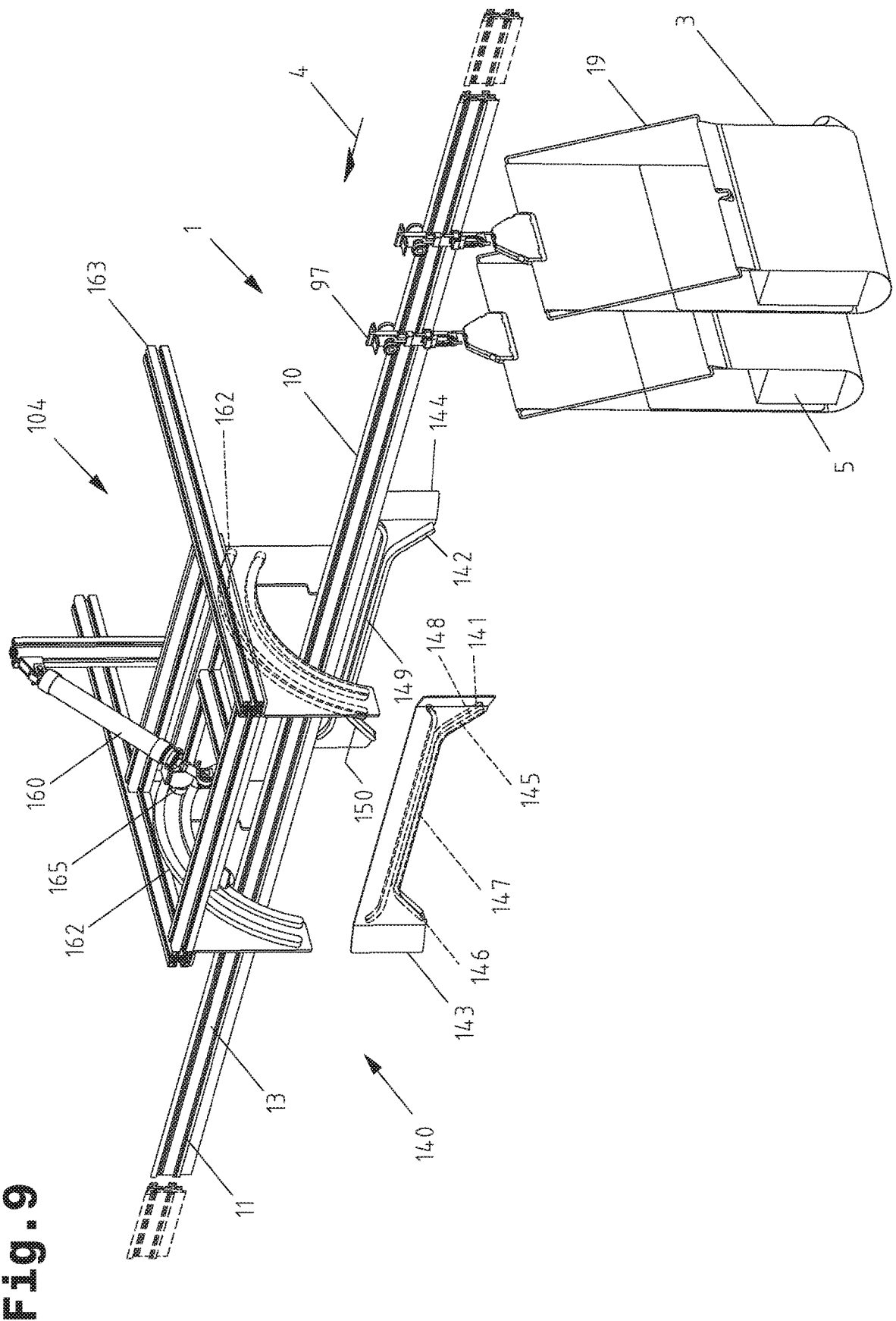
FIGS. 9 to 15 a sequence order of method steps for automatic unloading of one of the transport bags in an automated unloading station, in perspective views.
Figure 16A:
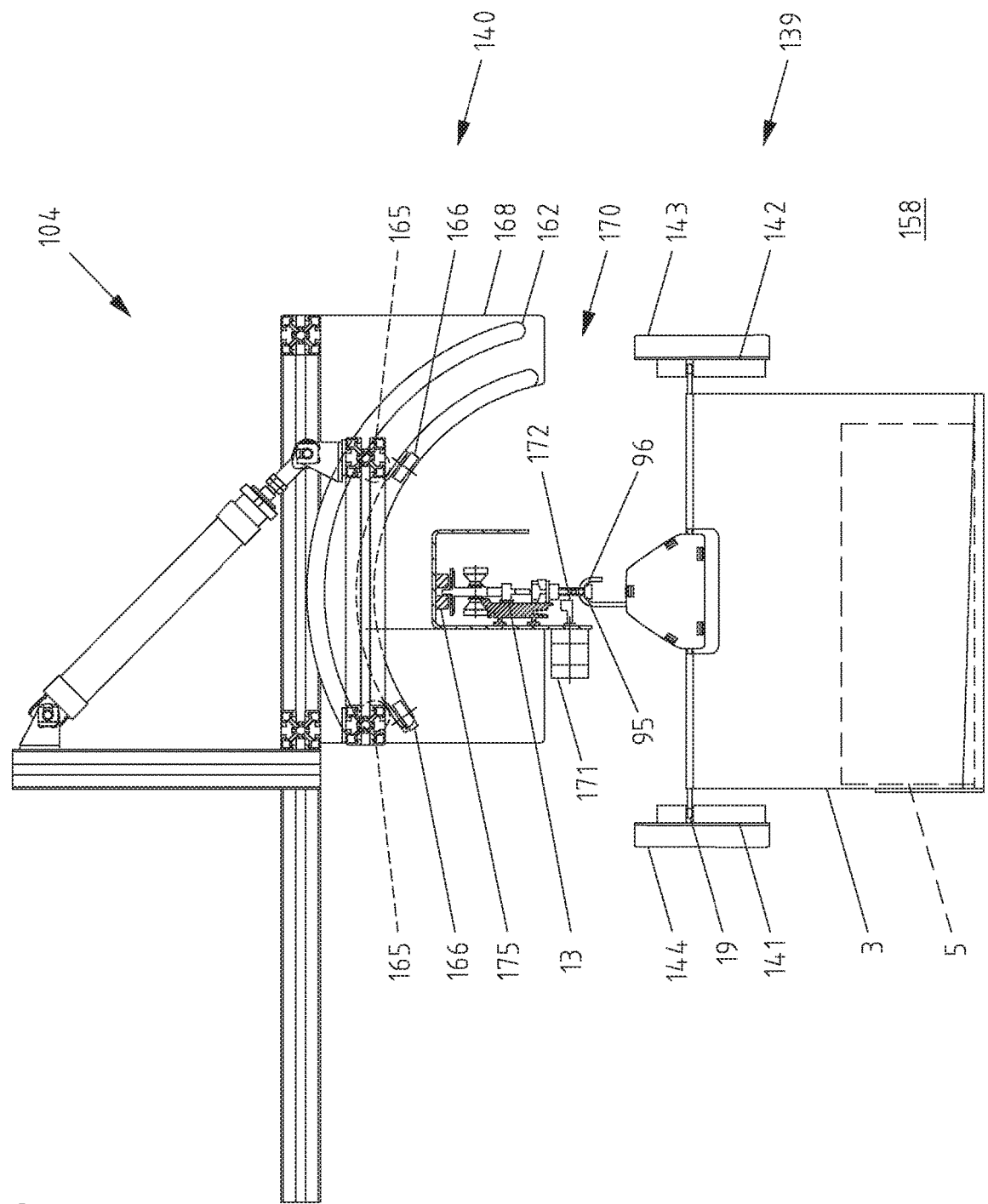
FIG. 16a a view onto the unloading device and a schematically shown transport bag according to FIG. 11, said transport bag being in a provisioning position, partially in a sectional view.
Figure 16B:
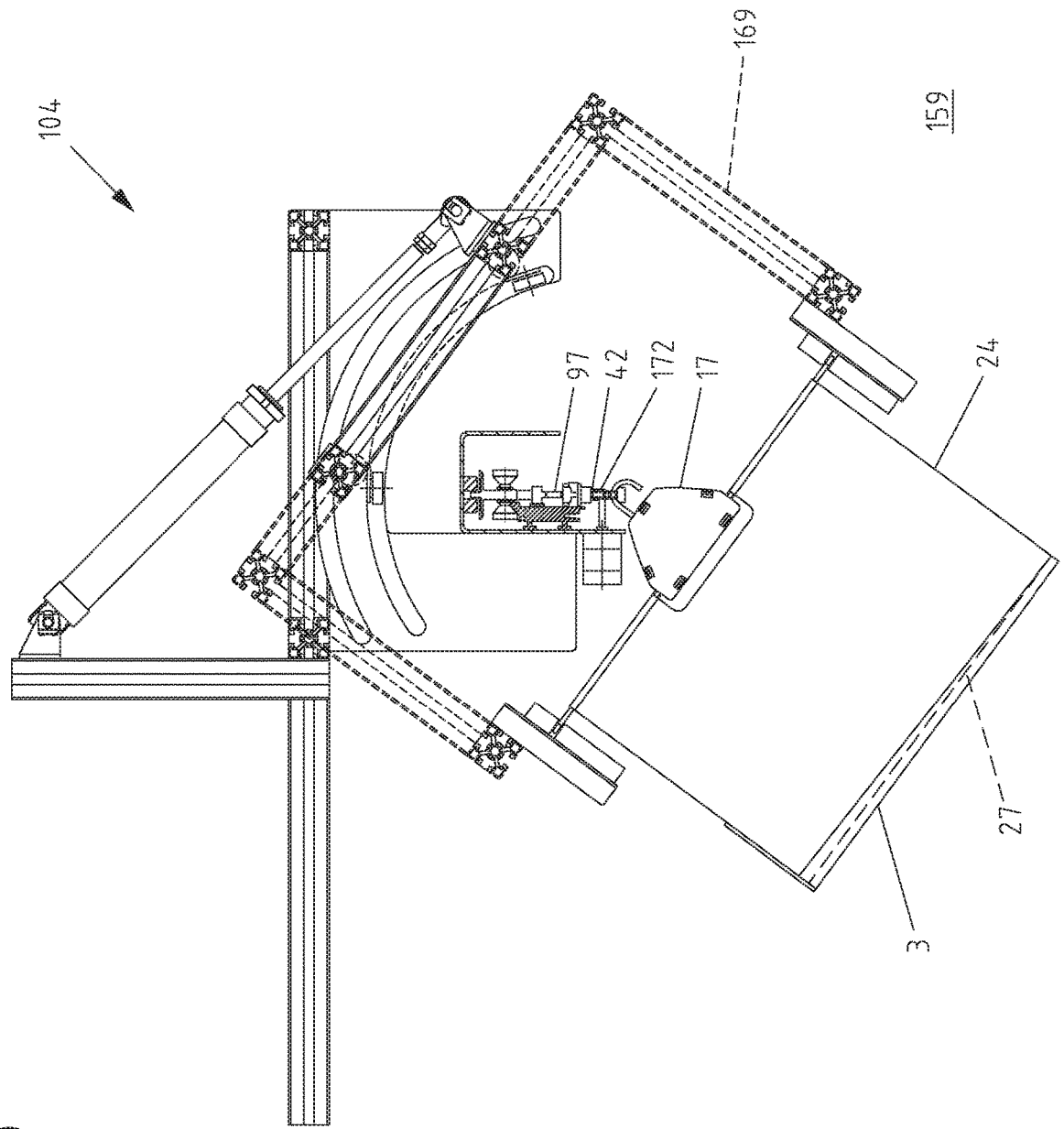
FIG. 16b a view onto the unloading device and a schematically shown transport bag according to FIG. 12, said transport bag being in an unloading position, partially in a sectional view.

FIGS. 9, 16a and 16b show the unloading station 104 in different views. It comprises the overhead conveying device 1 for transporting the transport bags into the unloading station 104 and for transporting the transport bags out the unloading station 104, an opening and closing device 139 for adjusting the bag body between the transport position and the loading and/or unloading position, and an unloading device 140 for unloading the bag body adjusted into the opened position.

The opening and closing device 139 comprises an actuation device for automatic opening and closing of the bag body, by means of which actuation device the frame 19 can be pivoted about the axis 20 relative to the suspended support 17 such that the bag body can be adjusted between the transport position and the loading and/or unloading position.

According to a possible embodiment, the actuation device comprises a driver mechanism for automated opening and closing of the bag body. The driver mechanism preferably comprises a first driver mechanism 141 and a second driver mechanism 142 which are arranged on both sides and below the overhead conveying device 1 for transporting the transport bag into the unloading station 104 and for transporting the transport bag out of the unloading station 104. In particular, the first driver mechanism 141 and the second driver mechanism 142 are arranged symmetrically to one another with respect to the transport bag, in particular the frame 19. However, in general, only one of the driver mechanisms 141 can be provided.

The first driver mechanism 141 is affixed to a first support frame 143 and the second driver mechanism 142 is affixed to a second support frame 144. The first support frame 143 and the second support frame 144 are parts of the actuation device.

In the shown exemplary embodiment, the first driver mechanism 141 comprises a lower guide assembly and an upper guide assembly, the second driver mechanism 142 also comprises a lower guide assembly and an upper guide assembly. The lower guide assembly and the upper guide assembly are arranged on top of one another at a distance such that between the lower guide assembly and the upper guide assembly of the first driver mechanism 141 and between the lower guide assembly and the upper guide assembly of the second driver mechanism 142, in each case, one of the longitudinal struts can be accommodated. The distance essentially corresponds to the diameter of the longitudinal strut 64. However, the first driver mechanism 141 and/or the second driver mechanism 142 can also comprise just the lower guide track.

The lower guide assembly and, if provided, the upper guide assembly of the first driver mechanism 141 and, if provided, of the second driver mechanism 142 comprise an inlet section 145 located upstream in a transport direction 4 of the transport bag, an outlet section 146 located downstream thereof, and an unloading section 147 located between the inlet section 145 and the outlet section 146. The lower guide assembly and, if provided, the upper guide assembly of the first driver mechanism 141 and/or of the second driver mechanism 142 extend in parallel to the transport direction 4 of the transport bag.

Figure 10:
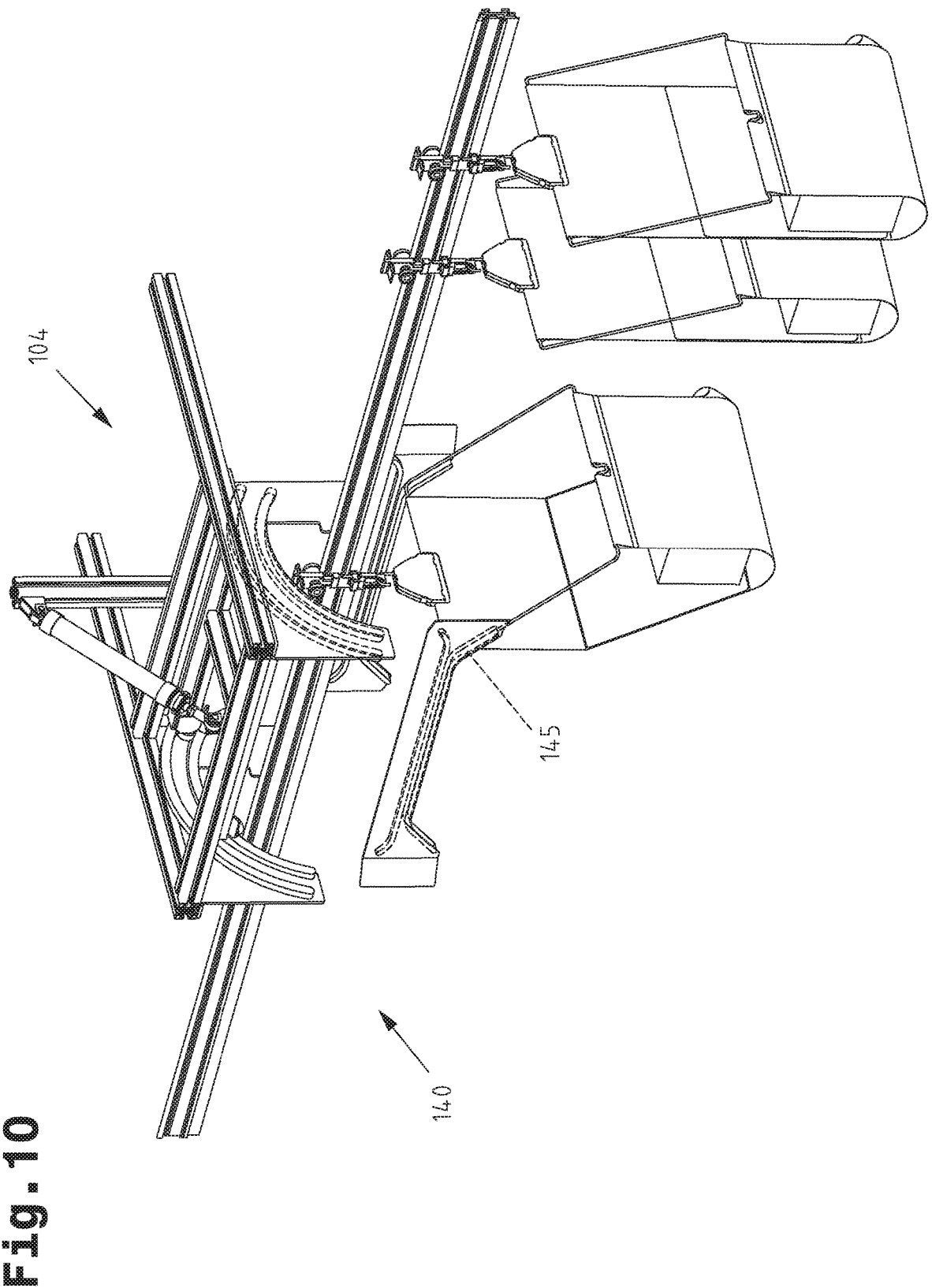

The inlet section 145 forms a tilted guide track 148 that can be brought into an abutting contact with the frame 19, in particular the longitudinal struts, such that the frame 19 is pivoted during transport of the transport bag into the unloading station 104, whereby the bag body is adjusted from the transport position in the direction of the loading and/or unloading position (FIG. 10).

Figure 11:
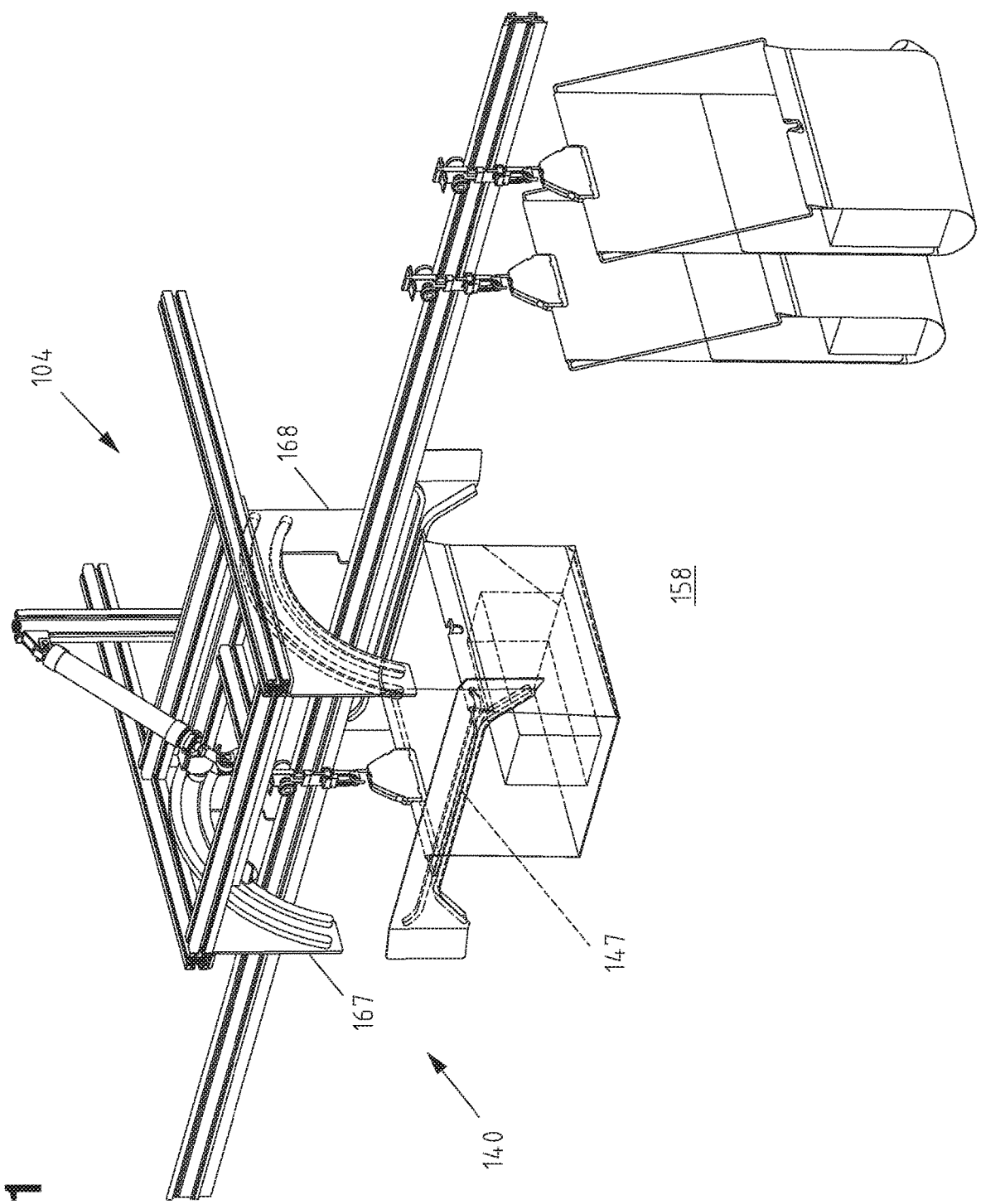

The unloading section 147 forms a guide track 149 which is essentially horizontal and which can be brought into an abutting contact with the frame 19, in particular the longitudinal struts, such that the frame 19 is held in the pivoted deflection position during the unloading operation whereby the bag body also remains in the opened position (FIG. 11).

Figure 14:
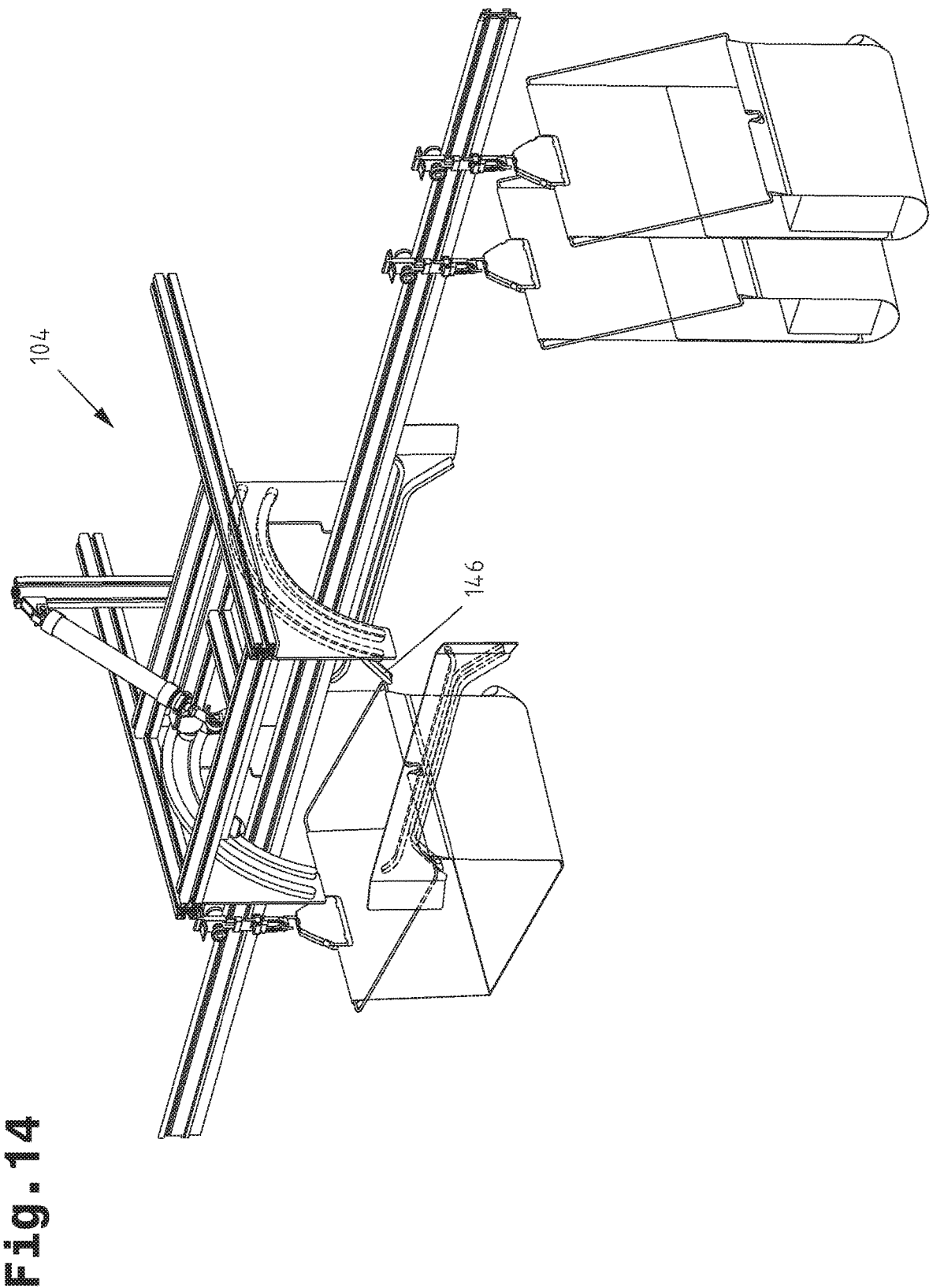
Figure 15:
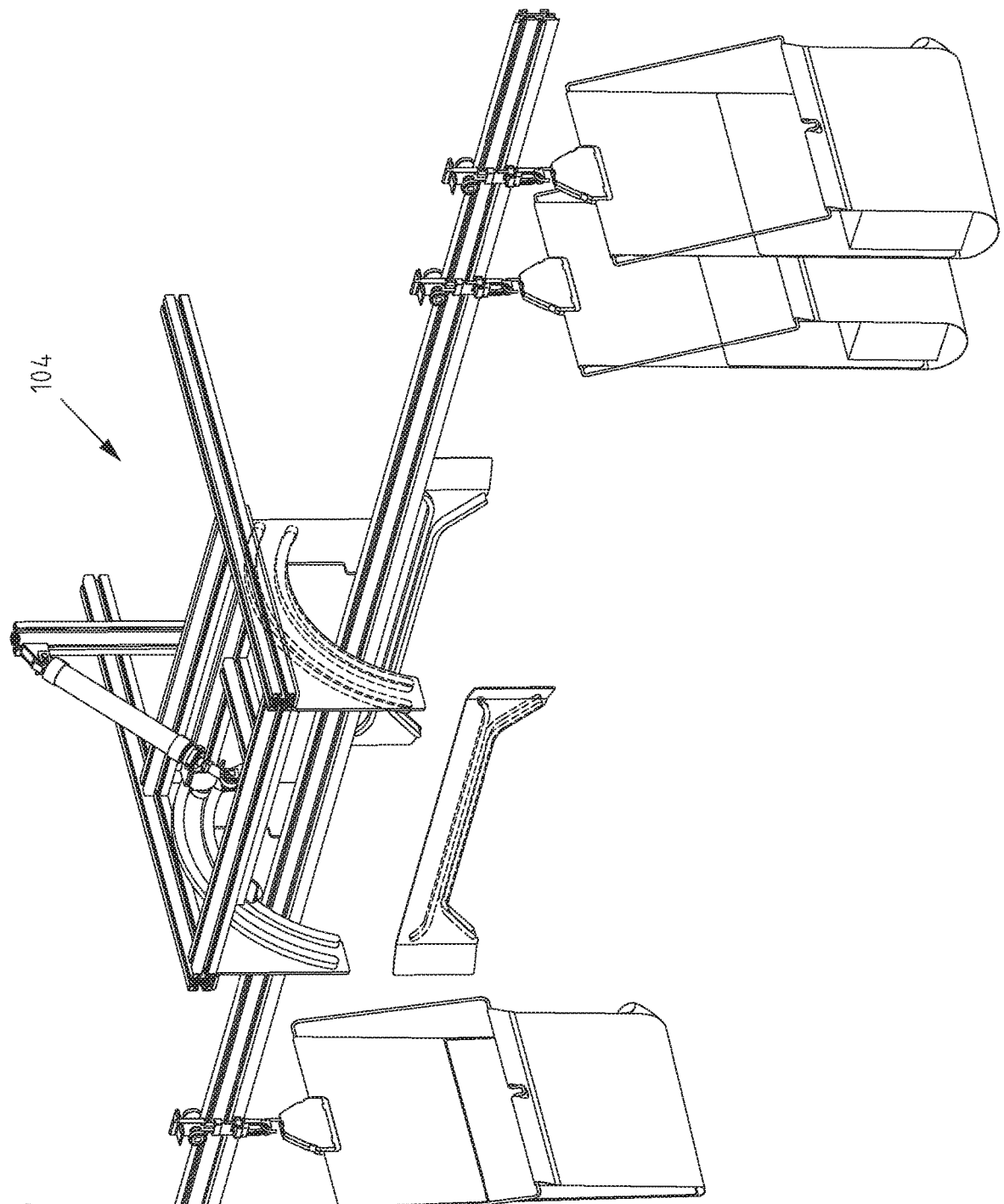

The outlet section 146 forms a tilted guide track 150 that can be brought into an abutting contact with the frame 19, in particular the longitudinal struts, such that the frame 19 is pivoted during transport of the transport bag out of the unloading station 104, whereby the bag body is adjusted from the loading and/or unloading position in the direction of the transport position (FIG. 14).

As can be seen in the figures, the unloading device 140 comprises an actuation device 156, by means of which transport bag along with the bag body can be tilted relative to the transport carrier 97 (and/or transport carrier 2) and about a tilting axis 157 extending essentially in parallel to the longitudinal extension of the overhead conveying device 1 between a provisioning position 158 (FIGS. 11, 16a) and an unloading position 159 (FIGS. 12, 16b), wherein in the unloading position 159, the article 5 can be discharged from the transport bag through the loading and/or unloading opening 24. The article 5 is preferably loaded into a container not depicted, or on a conveying device not depicted, for example a belt conveyor. This container can also represent the shipping cardboard box.

Figure 12:
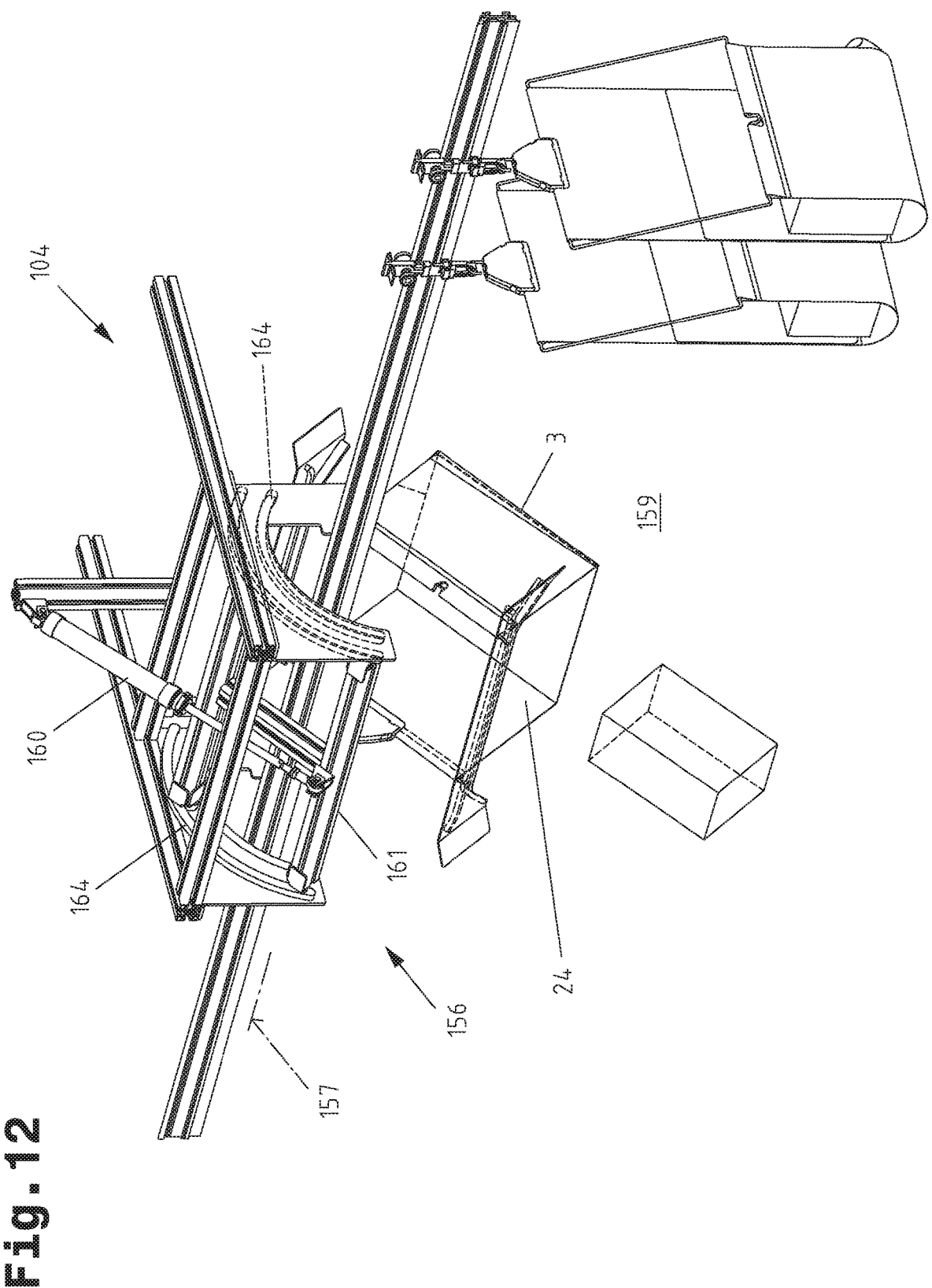
Figure 13:
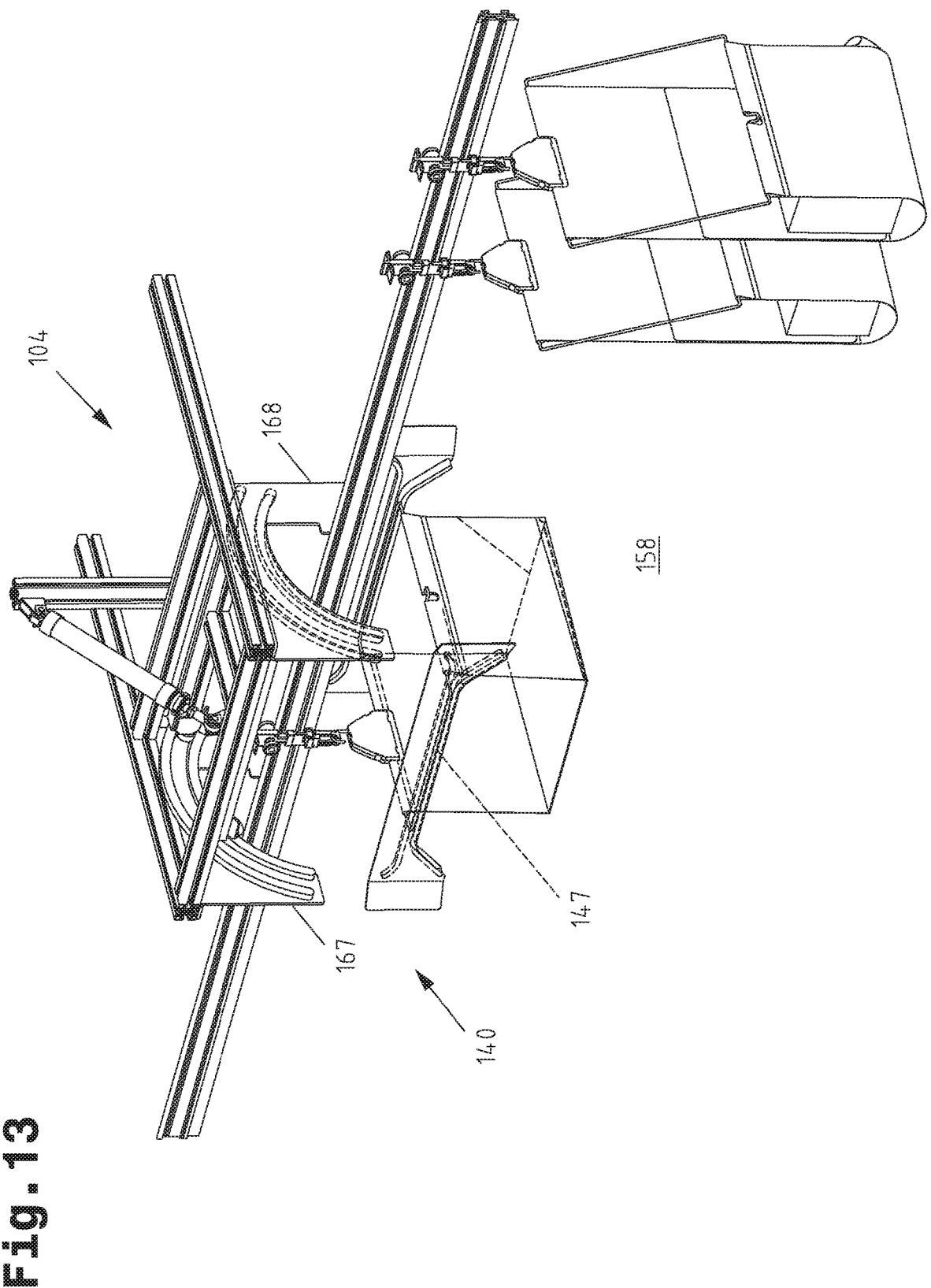

In a preferred first embodiment, the transport bag, along with the bag body adjusted into the opened position (unloading position), is tilted relative to the transport carrier 97 and about the tilting axis 157 between a provisioning position 158 (FIGS. 11, 16a) and an unloading position 159 (FIGS. 12, 16b). In other words, the bag body is adjusted into the unloading position in a precursory first step i) before the unloading—the transport bag is now in the provisioning position 158, and in a subsequent second step ii), the transport bag, along with the bag body adjusted into the unloading position, is pivoted relative to the transport carrier 97 and about the tilting axis 157—the transport bag is now in the unloading position 159.

After the unloading, the transport bag, along with the bag body adjusted into the unloading position, is tilted back from the unloading position 159 (FIGS. 12, 16b) into the provisioning position 158 (FIG. 11, 16a) relative to the transport carrier 97 and about the tilting axis 157. Afterwards, the transport bag is transported away by the overhead conveying device 1.

According to a second embodiment, the transport bag is tilted, still during the adjustment movement of the bag body between the transport position and the unloading position, relative to the transport carrier 97 and about the tilting axis 157 between the provisioning position 158 and the unloading position 159. In other words, for unloading, the transport bag is tilted from the provisioning position 158 into the unloading position 159 relative to the transport carrier 97 and about the tilting axis 157, still during the opening operation of the bag body from the transport position in the direction of the unloading position. Likewise, the transport bag can be tilted from the unloading position 159 into the provisioning position 158 relative to the transport carrier 97 and about the tilting axis 157 after unloading and during the closing operation of the bag body from the unloading position in the direction of the transport position.

The actuation device 156 of the unloading device 140 comprises a frame structure 161 which can be tilted by a drive 160 between an initial position and an actuation position about an axis extending in parallel to the transport direction 4 of the transport bag. The drive 160 is for example a fluid cylinder.

In the depicted embodiment, the frame structure 161 is mounted on a stationary support construction 163 via guide assemblies 162. Each of the guide assemblies 162 comprises a guide track 164 and guide rollers 165, 166 (FIGS. 9, 16a) which rest thereon in a rollable manner. The guide tracks comprise the (left) first guide track 164 and the (right) second guide track 164. The first guide track 164 is affixed to a first support frame 167 and the second guide track 164 to a second support frame 168. The frame structure 161 has frame sides opposing one another, wherein the guide rollers 165, 166 are arranged on the first frame side and the guide rollers 165, 166 are arranged on the second frame side.

As is shown in dashed lines exclusively in FIG. 16b for reasons of clarity, the actuation device of the opening and closing device 139 is mounted on the tiltable frame structure 161.

Specifically, the first driver mechanism 141 with the first support frame 143 and the second driver mechanism 142 with the second support frame 144 1 is affixed to the frame structure 161 via frame connections 169

Hence, the opening and closing device 139 is tilted together with the frame structure 161, and the transport bag is held essentially fixed also in the unloading position 159 (between the lower guide assembly and the upper guide assembly of the first driver mechanism 141 and, if available, between the lower guide assembly and the upper guide assembly of the second driver mechanism 144, one of the longitudinal struts each).

In FIGS. 16a, 16b, the unloading station 104 is shown with the opening and closing device 139. In FIG. 16a, the transport bag is in the provisioning position 158 and the bag body in its unloading position and/or opened position (also see FIG. 11). In FIG. 16b, the transport bag is in the unloading position 159 and the bag body in its unloading position and/or opened position (also see FIG. 12).

According to this embodiment, the unloading station 104 additionally comprises a locking device 170 for locking the transport carrier 97 during an unloading operation of the transport bag.

The locking device 170 comprises a locking element 172, for locking the transport carrier 97, movable between an ineffective initial position (16a) and an effective actuation position (FIG. 16b) by a drive 171. The locking element 172 comprises, for example, a stop, against which the front side wall 42, for example, runs and positions the transport carrier 97 in the transport direction 4.

The unloading station 104 can further comprise a guide device 175 extending in parallel to the transport direction 4 for laterally guiding the transport carrier 97 during a transport movement of the transport carrier 97 through the overhead conveying device 1 for transporting the transport bag unloading station 104 and for transporting the transport bag out of the unloading station 104. Moreover, the guide device 175 is effective during the unloading operation and when the transport bag is tilted between the provisioning position 158 and unloading position 159 relative to the transport carrier 97 and about the tilting axis 157, by the transport carrier 97 being fixed against a lateral movement (transversely with respect to the transport direction 4) and/or a lateral movement (transversely with respect to the transport direction 4) being limited.

The method for unloading an article 5 out of a transport bag is described in AT 520 517 A4 (A50320/2018) and is made the subject matter of this disclosure.

Even though the transport bag described above is particularly suitable for automatic loading and automatic unloading, it is equally possible to load the transport bag manually and to unload it manually. Manual loading and automatic unloading or vice versa is also possible.

Finally, it should also be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that the transport carriers and overhead conveying devices shown may in reality also comprise more or fewer components than those shown. In some cases, the shown transport carriers, and overhead conveying devices and/or their components may not be depicted to scale and/or be enlarged and/or reduced in size.

LIST OF REFERENCE NUMBERS

1 Overhead conveying device 50 Connecting device
2, 2' Transport carrier 51 Longitudinal axis
3 Hanging article 52 Supporting body connecting section
4 Transport direction
5 Article(s) 53 Base body connecting section
10 Guide device section
11 Drive device 54 Receiving opening
12 Profile rail 55 Suspension hook
13 Friction belt 56 Front wall
14 Driver element 57 Rear wall
15 Drive means 60 Profile groove
16 Hanger 61 Profile projection
17 Suspended support 62 Undercut
18 Axis 63 Insertion opening
19 Frame 64 Profile web
20 Axis 65 Profile head
21 Front wall 66 Insertion direction
22 Rear wall 67 Material web
23a First side edge 68 Locking element
23b Second side edge 69 Spring clip
24 Loading and/or unloading opening 70 Locking lug
71 Locking element
25 Side wall stop 72 Locking opening
26a First front wall section 80 Receiving slot
26b Second front wall section 81 Support surface
27 Base plate
82 Access channel
28a First rear wall section 85 Receiving chamber
28b Second rear wall section 86 Opening slot
29 Transport rest 87 Identifying means
30 Base body 88 Spring arm
31 Drive section 89 Transport carrier identifying section
32 Roller
33 Friction surface 90 Lower side wall
34 Engagement surface 91 Upper side wall
40a Supporting body 92 Lower wall section
40b Supporting body 93 Upper wall section
42 Front side wall 94 Guide edge
43 Rear side wall 95 First rest section
96 Second rest section 183 Upper side wall
97 Transport carrier 184 Receiving section
98 Midplane 185 Access channel
99 Edge 188 Guide edge
100 Minimum length 190 Transport lock
101 Opening width 190' Transport lock
104 Unloading station 190" Transport lock
139 Opening and closing device 191 Stop surface
140 Unloading device 192 Spring clip
141 Driver mechanism 192a, 192b Spring clip
142 Driver mechanism 193 Stop
143 Support frame 194 Guide element
144 Support frame 195 Guide element
145 Inlet section 196 Raised area
146 Outlet section 197 Bearing point
147 Unloading section 200 Loading rail
148 Guide track 201 Guide rest
149 Guide track 202 Track rest
Rest section
150 Guide track 203 Guideway 156 Actuation device of the unloading device 204 Overrun raised area
205 Guideway
157 Tilting axis 206 Rest section
158 Provisioning position
159 Unloading position 207 Rest section
160 Drive
161 Frame structure
162 Guide assembly
163 Support construction
164 Guide track
165 Guide roller
166 Guide roller
167 Support frame
168 Support frame
169 Frame connection
170 Locking device
171 Drive
172 Locking element
175 Guide device
180 Front side wall
181 Rear side wall
182 Lower side wall

The invention claimed is:

1. A transport carrier for an overhead conveying device, comprising
a base body,
a supporting body exchangeably mounted on the base body by a connecting device, the supporting body being configured for transporting a hanging article, and
a vertical longitudinal axis,
wherein the base body has
a drive section that cooperates with a guide device and/or a drive device of the overhead conveying device, and
a supporting body connecting section,
wherein the supporting body has
a base body connecting section,
wherein the connecting device has
a profile groove extending perpendicular to the vertical longitudinal axis in one of the base and supporting body connecting sections,
a profile projection extending perpendicular to the vertical longitudinal axis in one of the base and supporting body connecting sections, and
mutually engageable locking elements arranged and configured such that the base body and the supporting body are mutually locked against displacement in the longitudinal direction of the profile groove when the exchangeable supporting body is mounted on the base body,
wherein the profile groove forms an undercut and an insertion opening on an end side in the direction of a horizontal longitudinal extension of the profile groove perpendicular to the vertical longitudinal axis,
wherein the profile projection has a profile web and a profile head formed on the profile web so as to expand a cross-section, and
wherein the profile projection can be inserted into the profile groove via the insertion opening in an insertion direction oriented perpendicular to the vertical longitudinal axis.

2. The transport carrier according to claim 1, wherein the profile groove is arranged in the supporting body connecting section, and
the profile projection is arranged in the base body connecting section.

3. The transport carrier according to claim 1, wherein the transport carrier further comprises
a front wall, and
a rear wall,
wherein the profile groove extends from the front wall in the direction of the rear wall.

4. The transport carrier according to claim 1, wherein the profile groove is continuously opened toward the supporting body and along the horizontal longitudinal extension of the profile groove perpendicular to the vertical longitudinal axis.

5. The transport carrier according to claim 1, wherein the locking elements comprise
first locking elements configured as elastically resilient spring arms, each having a locking lug formed on a spring clip, in one of the base and supporting body connection sections on first and second sides of the profile groove, and
second locking elements configured as locking openings arranged in one of the base and supporting body connection sections on first and second sides of the profile web.

6. The transport carrier according to claim 5, wherein the connecting device further has
receiving slots arranged in one of the base body and supporting body connecting sections on the first and second sides of the profile web,
wherein each of the receiving slots has a support surface extending in the insertion direction of the supporting body and a locking opening arranged in a rear end region in the insertion direction of the supporting body.

7. The transport carrier according to claim 1, wherein
the supporting body has a completely enclosed receiving opening in a first configuration, and
the supporting body has a suspension hook in a second configuration.

8. The transport carrier according to claim 1, wherein the supporting body has
a front side wall running essentially in parallel to the vertical longitudinal axis,
a rear side wall running essentially in parallel to the vertical longitudinal axis,
a lower side wall extending between the front side wall and the rear side wall,
a receiving section for hanging a hanger of the hanging article, formed by the front side wall, the rear side wall and the lower side wall,
an access channel leading into the receiving section, via which access channel the hanger of the hanging article is inserted into the receiving section,
guide edges provided on the front side wall and rear side wall in lower wall sections and tapered towards each other in the direction toward the lower side wall, and
a transport lock arranged above the receiving section with a vertical distance and forming a stop surface, the stop surface limiting or impeding a relative shift of the hanger in the direction toward the transport lock.

9. The transport carrier according to claim 8, wherein
the transport lock comprises an elastically resilient spring arm arranged on the rear side wall, the spring arm having a spring clip and a stop arranged on a protruding end,
wherein the stop protrudes into the access channel and forms the stop surface on a side wall of the stop facing the receiving section.

10. The transport carrier according to claim 8, wherein the rear side wall and a spring clip comprise mutually engageable guide elements.

11. The transport carrier according to claim 8, wherein the transport lock comprises
- an elastically resilient first spring arm arranged on the front side wall, the first spring arm having a first spring clip and a first stop arranged on a protruding end of the first spring arm, and
- an elastically resilient second spring arm arranged on the rear side wall, the second spring arm having a second spring clip and a second stop arranged on a protruding end of the second spring arm,
- wherein the first and second stops of the first and second spring arms each protrude into the access channel and form the stop surfaces on a side wall facing the receiving section.

12. The transport carrier according to claim 8, wherein the transport lock comprises
- a raised area arranged on the rear side wall,
- wherein the raised area protrudes into the access channel and forms the stop surface.

13. The transport carrier according to claim 1, wherein the base body further has
- a receiving chamber extending perpendicular to the vertical longitudinal axis and having an opening slot formed on an end side of the receiving chamber in the direction of a horizontal longitudinal extension of the receiving chamber perpendicular to the vertical longitudinal axis, and
- an identifying means which can be inserted into the receiving chamber via the opening slot.

14. The transport carrier according to claim 13, wherein the receiving chamber comprises
- a base opened toward the supporting body, and
- an elastically resilient spring arm,
- wherein the spring arm has a rest surface and protrudes in a direction toward the base, so that the identifying means is supported on the rest surface in the receiving chamber and is held by the spring arm.

15. The transport carrier according to claim 13, wherein the receiving chamber and the identifying means are arranged between the drive section and the supporting body connecting section.

16. The transport carrier according to claim 1, wherein the supporting body further has
- a front side wall running essentially in parallel to the vertical longitudinal axis,
- a rear side wall running essentially in parallel to the vertical longitudinal axis,
- a lower side wall extending between the front side wall and the rear side wall,
- an upper side wall extending between the front side wall and rear side wall, and
- a receiving opening for a hanger of the hanging article, completely enclosed by the front, rear, lower, and upper side walls,
- wherein the front side wall and the rear side wall each comprise a lower wall section and an upper wall section,
- wherein the lower wall sections are provided with guide edges tapering towards each other in the direction towards the lower side wall and end in the lower side wall, and
- wherein the lower side wall comprises a first rest section and a second rest section, the first rest section and the second rest section being arranged on first and second sides of a midplane spanned between the front side wall and the rear side wall and each offset at a distance from the midplane, such that the hanger is positioned between the guide edges and can be supported on the first rest section and the second rest section.

17. The transport carrier according to claim 16, wherein the guide edges enclose an opening angle of less than 90°.

18. The transport carrier according to claim 1, wherein the supporting body further has
- a front side wall running essentially in parallel to the vertical longitudinal axis,
- a rear side wall running essentially in parallel to the vertical longitudinal axis,
- a lower side wall extending between the front side wall and the rear side wall,
- an upper side wall extending between the front side wall and the rear side wall,
- receiving section for a hanger of the hanging article, formed by the front side wall, the rear side wall and the lower side wall, and
- an access channel leading into the receiving section and allowing the hanger of the hanging article to be inserted into the receiving section,
- wherein the front side wall and the rear side wall each comprise a lower wall section,
- wherein the lower wall sections are provided with guide edges tapering towards each other in the direction towards the lower side wall and end in the lower side wall, and
- wherein the lower side wall comprises a first rest section and a second rest section, the first rest section and the second rest section being arranged on first and second sides of a midplane spanned between the front side wall and the rear side wall and each offset at a distance from the midplane, such that the hanger is positioned between the guide edges and can be supported on the first rest section and the second rest section.

19. The transport carrier according to claim 18, wherein the guide edges enclose an opening angle of less than 90°.

20. A transport carrier system for an overhead conveying device, comprising
- a first supporting body with a first base body connecting section, the first supporting body being used for transporting a first type of hanging article,
- a second supporting body with a second base body connecting section, the second supporting body being used for transporting a second type of hanging article, and
- a universally applicable base body,
- wherein the universally applicable base body has
  - a drive section that cooperates with a guide device and/or a drive device of the overhead conveying device, and
  - a supporting body connecting section,
- wherein the first supporting body or the second supporting body can be exchangeably fastened to the universally applicable base body by a connecting device, wherein the first supporting body together with the universally applicable base body forms a transport carrier in a first configuration, and the second supporting body together with the universally applicable base body forms a transport carrier in a second configuration,
- wherein the transport carrier in the first configuration has a completely enclosed receiving opening for transporting the first type of hanging article, and the transport carrier in the second configuration has a suspension hook for transporting the second type of hanging article,
- wherein the transport carrier has a vertical longitudinal axis, wherein the connecting device has
  - a profile groove extending perpendicular to the vertical longitudinal axis in one of the first base body connecting section and the supporting body connecting section or in one of the second base body connecting section and the supporting body connecting section, a profile projection extending perpendicular to the vertical longitudinal axis in one of the first base body connecting section and the supporting body connecting section or in one of the second base body connecting section and the supporting body connecting section, and mutually engageable locking elements arranged and configured such that the universally applicable base body and the first supporting body or the second supporting body are mutually locked against displacement in the longitudinal direction of the profile groove when the exchangeable first supporting body or second supporting body is mounted on the universally applicable base body, wherein the profile groove forms an undercut and an insertion opening on an end side in the direction of a horizontal longitudinal extension of the profile groove perpendicular to the vertical longitudinal axis, wherein the profile projection has a profile web and a profile head formed on the profile web so as to expand a cross-section, and wherein the profile projection can be inserted into the profile groove via the insertion opening in an insertion direction oriented perpendicular to the vertical longitudinal axis.

21. The transport carrier system according to claim 20, wherein the connecting device comprises positive engagement elements, wherein the positive engagement elements are designed to complement each other and mesh with each other, and wherein a first positive engagement element of the positive engagement elements comprises the profile groove and a second positive engagement element of the positive engagement elements comprises the profile projection.

22. The transport carrier system according to claim 21, wherein the connecting device forms a torsionally rigid and stable positive connection when the first supporting body or the second supporting body is mounted to the universally applicable base body so as to be exchangeable by the connecting device.

23. The transport carrier system according to claim 20, wherein the profile groove is arranged in the supporting body connecting section, and the profile projection is arranged in the first or second base body connecting section.

24. An overhead conveying device comprising a first transport carrier in a first configuration having a completely enclosed receiving opening for transporting a transport bag, a second transport carrier in a second configuration having a suspension hook for transporting a hanging article on a clothes hanger, a guide device, along which the first and second transport carriers can be moved, and/or a drive device, which transfers a driving force to the first and second transport carriers, wherein at least one of the first transport carrier and the second transport carrier has a base body, a supporting body exchangeably mounted on the base body by a connecting device, and a vertical longitudinal axis, wherein the base body has a drive section that cooperates with a guide device and/or a drive device of the overhead conveying device, and a supporting body connecting section, wherein the supporting body has a base body connecting section, wherein the connecting device has a profile groove extending perpendicular to the vertical longitudinal axis in one of the base and supporting body connecting sections, a profile projection extending perpendicular to the vertical longitudinal axis in one of the base and supporting body connecting sections, and mutually engageable locking elements arranged and configured such that the base body and the supporting body are mutually locked against displacement in the longitudinal direction of the profile groove when the exchangeable supporting body is mounted on the base body, wherein the profile groove forms an undercut and an insertion opening on an end side in the direction of a horizontal longitudinal extension of the profile groove perpendicular to the vertical longitudinal axis, wherein the profile projection has a profile web and a profile head formed on the profile web so as to expand a cross-section, and wherein the profile projection can be inserted into the profile groove via the insertion opening in an insertion direction oriented perpendicular to the vertical longitudinal axis.

* * * * *

UNITED STATES PATENT AND TRADEMARK OFFICE
CERTIFICATE OF CORRECTION

PATENT NO. : 12,479,666 B2  
APPLICATION NO. : 17/429122  
DATED : November 25, 2025  
INVENTOR(S) : Thomas Kriechbaum et al.

Page 1 of 1

It is certified that error appears in the above-identified patent and that said Letters Patent is hereby corrected as shown below:

In the Claims

In Claim 18, Line 11 (Column 34, Line 15): before "receiving" add --a--

Signed and Sealed this  
Twenty-third Day of December, 2025

John A. Squires  
*Director of the United States Patent and Trademark Office*